(12) United States Patent
Sullivan

(10) Patent No.: US 8,274,480 B2
(45) Date of Patent: Sep. 25, 2012

(54) CONTACT SENSITIVE DEVICE

(75) Inventor: Darius Martin Sullivan, Cambridge (GB)

(73) Assignee: New Transducers Limited, Huntigdon, Cambridgeshire (GB)

( * ) Notice: Subject to any disclaimer, the term of this patent is extended or adjusted under 35 U.S.C. 154(b) by 2091 days.

(21) Appl. No.: 10/482,865

(22) PCT Filed: Jul. 3, 2002

(86) PCT No.: PCT/GB02/03073
§ 371 (c)(1),
(2), (4) Date: Jan. 5, 2004

(87) PCT Pub. No.: WO03/005292
PCT Pub. Date: Jan. 16, 2003

(65) Prior Publication Data
US 2004/0160421 A1    Aug. 19, 2004

Related U.S. Application Data

(60) Provisional application No. 60/303,781, filed on Jul. 10, 2001.

(30) Foreign Application Priority Data

Jul. 4, 2001 (GB) .................................. 0116310.4

(51) Int. Cl.
*G09G 5/00* (2006.01)
(52) U.S. Cl. .......................... 345/173; 345/177; 345/178
(58) Field of Classification Search .................. 345/173, 345/177, 178
See application file for complete search history.

(56) References Cited

U.S. PATENT DOCUMENTS

| | | | |
|---|---|---|---|
| 3,885,224 A * | 5/1975 | Klahr | .............................. 367/11 |
| 4,246,439 A | 1/1981 | Romein | |
| 4,389,711 A | 6/1983 | Hotta et al. | |
| 4,393,268 A | 7/1983 | Guedj et al. | |
| 5,161,126 A | 11/1992 | Marcus | |

(Continued)

FOREIGN PATENT DOCUMENTS

DE        4143364        9/1993

(Continued)

OTHER PUBLICATIONS

U.S. Appl. No. 09/869,432, filed Aug. 21, 2001, Chapman et al.

(Continued)

*Primary Examiner* — Bipin Shalwala
*Assistant Examiner* — Afroza Chowdhury
(74) *Attorney, Agent, or Firm* — Zagorin O'Brien Graham LLP

(57) ABSTRACT

A contact sensitive device (10) comprising a member (12) capable of supporting bending waves, a first sensor (16) mounted on the member for measuring bending wave vibration in the member, the sensor (16) determining a first measured bending wave signal and a processor which calculates information relating to a contact on the member (12) from the measured bending wave signal, the processor applying a correction based on the dispersion relation of the material of the member (12) supporting the bending waves, characterized in that the device (10) comprises a second sensor (16) to determine a second measured bending wave signal which is measured simultaneously with the first measured bending wave signal and the processor calculates a dispersion corrected function of the two measured bending wave signals which is selected from the group consisting of a dispersion corrected correlation function, a dispersion corrected convolution function, a dispersion corrected coherence function and other phase equivalent functions to determine information relating to the contact.

2 Claims, 14 Drawing Sheets

U.S. PATENT DOCUMENTS

| | | | |
|---|---|---|---|
| 5,162,618 A | 11/1992 | Knowles | |
| 5,262,777 A | 11/1993 | Low et al. | |
| 5,305,239 A | 4/1994 | Kinra | |
| 5,329,070 A | 7/1994 | Knowles | |
| 5,412,189 A | 5/1995 | Cragun | |
| 5,541,372 A | 7/1996 | Baller et al. | |
| 5,591,945 A * | 1/1997 | Kent | 178/18.04 |
| 5,628,031 A | 5/1997 | Kikinis et al. | |
| 5,637,839 A | 6/1997 | Yamaguchi et al. | |
| 5,638,093 A | 6/1997 | Takahashi et al. | |
| 5,691,959 A * | 11/1997 | Kriewall et al. | 367/129 |
| 5,717,432 A | 2/1998 | Miwa et al. | |
| 5,717,434 A | 2/1998 | Toda | |
| 5,748,314 A * | 5/1998 | Kitayoshi | 356/450 |
| 5,831,934 A | 11/1998 | Gill et al. | |
| 5,838,088 A | 11/1998 | Toda | |
| 5,856,820 A * | 1/1999 | Weigers et al. | 345/177 |
| 5,877,458 A | 3/1999 | Flowers | |
| 5,892,652 A | 4/1999 | Bony et al. | |
| 5,986,224 A * | 11/1999 | Kent | 178/18.04 |
| 6,005,327 A | 12/1999 | Toda | |
| 6,049,328 A | 4/2000 | Vanderheiden | |
| 6,060,812 A | 5/2000 | Toda | |
| 6,072,475 A | 6/2000 | van Ketwich | |
| 6,091,406 A | 7/2000 | Kambara et al. | |
| 6,157,373 A | 12/2000 | Rego | |
| 6,160,757 A | 12/2000 | Täger et al. | |
| 6,246,638 B1 | 6/2001 | Zook et al. | |
| 6,335,725 B1 | 1/2002 | Koh et al. | |
| 6,343,162 B1 | 1/2002 | Saito et al. | |
| 6,366,277 B1 | 4/2002 | Armstrong | |
| 6,384,743 B1 | 5/2002 | Vanderheiden | |
| 6,400,996 B1 | 6/2002 | Hoffberg et al. | |
| 6,414,673 B1 | 7/2002 | Wood et al. | |
| 6,535,147 B1 | 3/2003 | Masters et al. | |
| 6,580,799 B1 | 6/2003 | Azima et al. | |
| 6,871,149 B2 | 3/2005 | Sullivan et al. | |
| 6,891,527 B1 | 5/2005 | Chapman et al. | |
| 6,922,642 B2 | 7/2005 | Sullivan | |
| 7,157,649 B2 * | 1/2007 | Hill | 178/18.04 |
| 7,184,898 B2 | 2/2007 | Sullivan et al. | |
| 2001/0006006 A1* | 7/2001 | Hill | 73/606 |
| 2001/0026625 A1 | 10/2001 | Azima et al. | |
| 2002/0125065 A1 | 9/2002 | Bank | |
| 2002/0135570 A1 | 9/2002 | Iisaka et al. | |
| 2003/0066692 A1 | 4/2003 | Devige et al. | |
| 2003/0217873 A1 | 11/2003 | Paradiso et al. | |
| 2005/0146511 A1 | 7/2005 | Hill et al. | |
| 2005/0146512 A1 | 7/2005 | Hill et al. | |
| 2005/0146513 A1 | 7/2005 | Hill et al. | |
| 2005/0174338 A1 | 8/2005 | Ing et al. | |
| 2005/0212777 A1 | 9/2005 | Ing et al. | |
| 2006/0132464 A1 | 6/2006 | Sullivan | |
| 2007/0118305 A1 | 5/2007 | Sullivan | |

FOREIGN PATENT DOCUMENTS

| | | |
|---|---|---|
| EP | 0 296 569 A2 | 12/1988 |
| EP | 0 526 879 A1 | 2/1993 |
| EP | 0 597 228 A2 | 5/1994 |
| EP | 0 656 603 A1 | 6/1995 |
| FR | 2 787 608 | 6/2000 |
| GB | 2 301 217 A | 11/1996 |
| JP | 08-297534 | 11/1996 |
| WO | WO 84/00427 | 2/1984 |
| WO | WO 94/02911 | 2/1994 |
| WO | WO 96/11378 | 4/1996 |
| WO | WO 97/09842 | 3/1997 |
| WO | WO 97/09847 | 3/1997 |
| WO | WO 99/65274 | 12/1999 |
| WO | WO0030025 A1 | 5/2000 |
| WO | WO 00/38104 | 6/2000 |
| WO | WO 01/43063 A1 | 6/2001 |
| WO | WO 01/48684 A2 | 7/2001 |
| WO | WO 02/01490 A1 | 1/2002 |
| WO | WO 03/005292 A1 | 1/2003 |
| WO | WO 03/067511 A2 | 8/2003 |

OTHER PUBLICATIONS

Non-Final Office Action mailed Nov. 17, 2008 in U.S. Appl. No. 11/338,958, 35 pages.

Bendat et al., Engineering Applications of Correlation and Spectral Analysis, Chapter 6 entitled "Propagation Path Identification" and Chapter 7 entitled "Single Input/Multiple Output Problems," a Wiley-Interscience Publication, 1980, pp. 121-167.

Brink, M. C., "The Acoustic Representation of Bending Waves", Laboratory of Acoustic Imaging and Sound Control, Delft University of Technology, Nov. 2002, pp. i-69.

Ishii Hiroshi, et al., "PingPongPlus: Design of an Athletic-Tangible Interface for Computer-Supported Cooperative Play", Published in the Proceedings of CHI'99, May 15-20, 1999, pp. 1-8.

Kim, Young Jin, et al., "Acoustic Generation in Liquid Crystals", Sep. 27, 1999, vol. 75, No. 13, pp. 1985-1987.

Paradiso, J. A., et al., "Passive Acoustic Knock Tracking for Interactive Windows", ACM CHI 2002 Conference, Minneapolis, Minnesota, Apr. 20-25, 2002, (2 pages).

Paradiso, J. A., "Several Sensor Approaches that Retrofit Large Surfaces for Interactivity", ACM Ubicomp 2002 Workshop on Collaboration with Interactive Walls and Tables, Gothenburg, Sweden, Sep. 29, 2002, pp. 1-8.

* cited by examiner

Graph of a dispersive impulse response

Graph of a dispersive frequency response

Graph of a non-dispersive frequency response

CONTACT SENSITIVE DEVICE

CROSS-REFERENCE TO RELATED APPLICATION(S)

This application claims the benefit under 35 U.S.C. §119(e) of application No. 60/303,781, filed Jul. 10, 2001.

TECHNICAL FIELD

The invention relates to contact sensitive devices.

BACKGROUND ART

Visual displays often include some form of touch sensitive screen. This is becoming more common with the emergence of the next generation of portable multimedia devices such as palm top computers. The most established technology using waves to detect contact is Surface Acoustic Wave (SAW), which generates high frequency waves on the surface of a glass screen, and their attenuation by the contact of a finger is used to detect the touch location. This technique is "time-of-flight", where the time for the disturbance to reach one or more sensors is used to detect the location. Such an approach is possible when the medium behaves in a non-dispersive manner i.e. the velocity of the waves does not vary significantly over the frequency range of interest.

In contrast in WO01/48684 to the present applicant, a contact sensitive device and method of using the same are proposed. The device comprises a member capable of supporting bending wave vibration and a sensor mounted on the member for measuring bending wave vibration in the member and for transmitting a signal to a processor whereby information relating to a contact made on a surface on the member is calculated from the change in bending wave vibration in the member created by the contact.

By bending wave vibration it is meant an excitation, for example by the contact, which imparts some out of plane displacement to the member. Many materials bend, some with pure bending with a perfect square root dispersion relation and some with a mixture of pure and shear bending. The dispersion relation describes the dependence of the in-plane velocity of the waves on the frequency of the waves.

Two types of contact sensitive device are proposed, namely a passive sensor in which bending wave vibration in the member is only excited by the contact and an active sensor in which the contact sensitive device further comprises an emitting transducer for exciting bending wave vibration in the member to probe for information relating to the contact. In the active sensor, information relating to the contact is calculated by comparing the response of waves generated by the emitting transducer in the absence of a contact to the response caused by the mechanical constraint of the presence of a contact.

Bending waves provide advantages, such as increased robustness and reduced sensitivity to surface scratches, etc. However, bending waves are dispersive i.e. the bending wave velocity, and hence the "time of flight", is dependent on frequency. In general, an impulse contains a broad range of component frequencies and thus if the impulse travels a short distance, high frequency components will arrive first. This effect must be corrected.

In WO01/48684, a correction to convert the measured bending wave signal to a propagation signal from a non-dispersive wave source may be applied so that techniques used in the fields of radar and sonar may be applied to detect the location of the contact. The application of the correction is illustrated in FIGS. 1a to 1d.

FIG. 1a shows an impulse in an ideal medium with a square root dispersion relation and demonstrates that a dispersive medium does not preserve the waveshape of an impulse. The outgoing wave (60) is evident at time t=0 and the echo signal (62) is spread out over time, which makes a determination of an exact contact position problematic.

In a non-dispersive medium such as air, a periodic variation of the frequency response is characteristic of a reflection, and is often referred to as comb filtering. Physically, the periodic variation in the frequency response derives from the number of wavelengths that fit between the source and the reflector. As the frequency is increased and the number of wavelengths fitting in this space increases, the interference of the reflected wave with the outgoing wave oscillates between constructive and destructive.

Calculating the Fourier transform of the dispersive impulse response of FIG. 1a produces the frequency response shown in FIG. 1b. The frequency response is non-periodic and the periodic variation with wavelength translates to a variation in frequency that gets slower with increasing frequency. This is a consequence of the square root dispersion in which the wavelength is proportional to the square root of the inverse of frequency. The effect of the panel on the frequency response is therefore to stretch the response as a function of frequency according to the panel dispersion. Consequently, a correction for the panel dispersion may be applied by applying the inverse stretch in the frequency domain, thus restoring the periodicity present in the non-dispersive case.

By warping the frequency axis with the inverse of the panel dispersion, FIG. 1b may be transformed into the frequency response for the non-dispersive case (FIG. 1c) in which the frequency of excitation is proportional to the inverse of the wavelength. This simple relationship translates the periodic variation with decreasing wavelength to a periodic variation with increasing frequency as shown in FIG. 1c.

Applying the inverse Fast Fourier Transform (fft) to the trace of FIG. 1c produces an impulse response shown in FIG. 1d which is corrected for dispersion and where the clear reflection is restored. As is shown in FIG. 1d any particular waveshape of an impulse is preserved in time since the waves travelling in a non-dispersive medium have a constant velocity of travel, independent of their frequency. Accordingly, the task of echo location is relatively straight forward. The outgoing wave (50) is evident at time t=0, together with a clear reflection (52) at 4 ms. The reflection (52) has a magnitude which is approximately one-quarter of the magnitude of the outgoing wave (50).

The procedure described is not applicable if the impulse has occurred at an unknown time $t_0$ and the distance x from the response to an initial impulse may only be calculated if the impulse occurs at $t_0=0$.

It is an object of the present invention to provide an alternative contact sensitive device which uses bending wave vibration for extracting information relating to the contact.

DISCLOSURE OF INVENTION

According to one aspect of the invention, there is provided a contact sensitive device comprising a member capable of supporting bending waves, a first sensor mounted on the member for measuring bending wave vibration in the member, the first sensor determining a first measured bending wave signal and a processor which calculates information relating to a contact on the member from the measured bending wave signal, the processor applying a correction based on the dispersion relation of the material of the member supporting the bending waves, characterised in that the device comprises a second sensor to determine a second measured bending wave signal which is measured simultaneously with the first measured bending wave signal and the processor calculates a dispersion corrected function of the two measured bending wave signals which is selected from the group consisting of a dispersion corrected correlation function, a dispersion corrected convolution function, a dispersion corrected coherence function and other phase equivalent functions to determine information relating to the contact.

According to a second aspect of the invention, there is provided a method of determining information relating to a contact on a contact sensitive device comprising the steps of providing a member capable of supporting bending waves and a first sensor mounted on the member for measuring bending wave vibration in the member, determining, using the sensor, a first measured bending wave signal characterised by providing a second sensor mounted on the member to determine a second measured bending wave signal, measuring the second measured bending wave signal simultaneously with the first measured bending wave signal, calculating a dispersion corrected function of the two measured bending wave signals which is selected from the group consisting of a dispersion corrected correlation function, a dispersion corrected convolution function, a dispersion corrected coherence function and other phase equivalent functions and processing the measured bending wave signals to calculate information relating to the contact by applying the dispersion corrected function.

The following features may be applied to both the device and the method with the processor being adapted to provide many of the calculations or processing steps of the method.

The dispersion corrected function may be calculated as follows:

calculate $\hat{W}_1(\omega)$ and $\hat{W}_2(\omega)^*$ which are the Fourier transformation and complex conjugate Fourier transformation of the two measured bending wave signals $W_1(t)$ and $W_2(t)$; t represents time $\omega$ is $2\pi f$ where f is frequency.

calculate a first intermediate function $\hat{W}_1(\omega)\hat{W}_2^*(\omega)$;

calculate a second intermediate function $M(\omega)$ which is a function of $\hat{W}_1(\omega)\hat{W}_2^*(\omega)$;

apply a frequency stretching operation $f(\omega)$, as described above in relation to WO01/48684, to $M(\omega)$ to give the dispersion corrected correlation function:

$$G(t) = \frac{1}{2\pi}\int_{-\infty}^{+\infty} M[f(\omega)]\exp(i\omega t)d\omega.$$

The intermediate function $M(\omega)$ may simply be $\hat{W}_1(\omega)\hat{W}_2^*(\omega)$ which gives a standard dispersion corrected correlation function. Alternatively, $M(\omega)$ may be a function which modifies the amplitude but not the phase of $\hat{W}_1(\omega)\hat{W}_2^*(\omega)$ to give a phase equivalent function to the standard dispersion corrected correlation function. Since the phase equivalent function and the standard dispersion corrected correlation function have the same phase properties, they have a maximum at the same position. The phase information in the measured bending wave signals may be used to acquire information about the contact in particular the location thereof. The location may be calculated from the time at which the maximum in the functions occurs.

$M(\omega)$ may be selected from the following functions which all yield phase equivalent functions to the standard dispersion corrected correlation function:

a) $M(\omega) = \dfrac{\hat{W}_1(\omega)\hat{W}_2^*(\omega)}{|\hat{W}_1(\omega)\hat{W}_2^*(\omega)|}$ Thus $M(\omega)$ may normalise the amplitudes of $\hat{W}_1(\omega)\hat{W}_2^*(\omega)$ to unity to yield a normalised dispersion corrected correlation function otherwise known as a dispersion corrected coherence function.

b) $M(\omega) = \dfrac{\hat{W}_1(\omega)\hat{W}_2^*(\omega)}{\sqrt{|\hat{W}_1(\omega)\hat{W}_2^*(\omega)|}}$ Thus $M(\omega)$ may act on the amplitudes of $\hat{W}_1(\omega)\hat{W}_2^*(\omega)$ to yield a dispersion corrected correlation function with a modified peak shape.

c) $M(\omega)=\hat{W}_1(\omega)\hat{W}_2^*(\omega)\phi[|\hat{W}_1(\omega)\hat{W}_2^*(\omega)|]$ where $\phi(x)$ is a real valued function Thus $M(\omega)$ may apply a general modification to yield a phase equivalent function having a different amplitude to the standard correlation function.

d) $M(\omega)=\hat{W}_1(\omega)\hat{W}_2^*(\omega)\psi(\omega)$ where $\psi(\omega)$ is a real valued function Thus $M(\omega)$ may apply a general frequency-dependent scaling to yield a phase equivalent function having a different amplitude to the standard correlation function. Such a scaling is also known as emphasis.

Alternatively, $M(\omega)$ may be the function $\hat{D}(\omega)$ which is the Fourier transformation of the correlation function $D(t)$:

$$D(t)=\int_{-\infty}^{+\infty} W_1(t+t')W_2(t')dt'$$

$\hat{D}(\omega)$ is mathematically equivalent to $\hat{W}_1(\omega)\hat{W}_2^*(\omega)$ and may be arrived at without calculating $\hat{W}(\omega)$ and $\hat{W}_2(\omega)^*$. This is an alternative method to calculating the standard dispersion corrected correlation function. The steps are calculate $D(t)$; calculate $\hat{D}(\omega)$ and apply a frequency stretching operation to arrive at the dispersion corrected correlation function:

$$G(t) = \frac{1}{2\pi}\int_{-\infty}^{+\infty} \hat{D}[f(\omega)]\exp(i\omega t)d\omega.$$

One advantage of using the dispersion corrected correlation function is that it is applicable in situations where the precise time, $t_0$, at which a contact occurred is not known. This is because an offset $t_0$ (i.e. $t_0 \neq 0$) in the response functions is represented as an additional factor $\exp(i\omega t_0)$ in the Fourier transformations, $\hat{W}_1(\omega)$ and $\hat{W}_2(\omega)$ which cancels in the intermediate function $\hat{W}_1(\omega)\hat{W}_2^*(\omega)$.

A transducer may act as both the first and second sensor whereby, the dispersion corrected correlation function is an autocorrelation function. The autocorrelation function may be calculated applying the same steps for the dispersion corrected correlation function using $W_1(t)=W_2(t)$.

The frequency stretching operation may be determined as described in relation to FIGS. 1a to 1d by $\hat{\Omega}(\omega)=\hat{W}[f(\omega)]$ in which $f(\omega)$ is chosen so that $\hat{\Omega}(\omega)$ represents an imaginary response of a medium where bending waves of all frequencies travel with identical phase velocity. For example, for bending mode vibrations that follow a square-root relation of wavevector, k, to angular frequency, $k=C\sqrt{\omega}$, the frequency stretching operation $f(\omega)=vC\sqrt{\omega}$ gives an imaginary response, $\Omega(\omega)$, of a medium with constant arbitrary phase velocity v. C is a constant and is defined by $C=(\mu/B)^{1/4}$ where $\mu$=mass per unit area, and B=bending stiffness.

The inverse Fourier transform, $\Omega(t)$ may be examined to determine the distance to the site of the contact. $\Omega(t)$, is centred at a value $t_1$ that is proportional to the distance between the site of the contact and each sensor. The dispersion corrected correlation function may also be used to determine the precise location of the contact. For example, for the function, G(t), the centre of the correlation function is located at $t=(x_1-x_2)/v$ where $x_1$ and $x_2$ are the distances from the contact point to the respective vibration sensors. The dispersion corrected correlation function may therefore be used to determine a difference in path-length (i.e. $x_1-x_2$) between the contact site and the two sensors. This quantity, $x_1-x_2$, defines a hyperbola of possible locations of the contact on the panel surface. If a third sensor is provided, a second dispersion corrected correlation function, from a different combination of sensor positions, provides a second path-length difference, eg. $x_1-x_3$. Alternatively, a second pair of sensors may be mounted to the member to provide a second dispersion corrected correlation function. In many cases (for example when the sensors are positioned in the four corners of a rectangular panel), the two hyperbolic curves defined by the two path-length differences have a unique intersection point which determines unambiguously the location of the contact.

Another advantage of using the dispersion corrected correlation function is in the treatment of waves reflected from boundaries of the member. The reflected waves create the effect of virtual sources which are located outside the physical boundaries, specifically, at the contact site reflected in the axes of the boundaries. The impulse generated by a contact may show features corresponding to 'echoes' which arrive after the direct waves of the impulse. By applying the dispersion correction to an impulse at t=0, discrete reflections may be resolved as peaks in the corrected impulse response. The location of these peaks may be used as additional information for determining the location of the contact. This may be particularly effective if the sensitivity, or acceptance, of the sensors is not independent of the direction of the incoming wave since the measured signal corresponding to the direct path from the contact may be weaker than the signal due to reflected waves.

The dispersion-corrected autocorrelation function may be applied to locate the path-length difference between the sensor and real and virtual sources of bending waves arising from reflections at the boundaries. Such information may help the determination of the contact location.

Reflected waves may be suppressed by placing an absorbing material in contact with the edges of the member. Alternatively, the processor may be adapted to remove the contribution of reflected waves from the measured bending wave signal. This may be achieved on the basis that in a dispersive medium, i.e. one with a dispersion relation of the form $k=C\sqrt{\omega}$, low-frequency components travelling along the direct path may arrive after the first high-frequency reflected waves. This processor may be adapted to provide a moving average low-pass filtering operation on the original measured bending wave signal where the width of the averaging window varies locally with the time coordinate as $\Delta t \propto t^2$.

The measured bending wave signal may be transformed to a response in which the signals due to the direct and reflected wave both oscillate with constant but different periods. For example, a measured bending wave signal W(t), from a contact at time t=0 may be transformed on the time axis by using $U(\tau)=W(1/\tau)$. In the function $U(\tau)$ the signal from a sharp impulse propagating on a dispersive member oscillates with a constant period. Furthermore, the oscillations from the direct wave have a longer period than those of the reflected waves. The contribution of reflected waves can therefore be removed by a low pass filter operation on $U(\tau)$. The response may then be transformed back to linear units of time, as $W'(t)=U(1/t)$. The procedure may be generalised to other forms of the dispersion relation.

For a perfect rejection of reflected waves, it is necessary to know the dispersion relation in the member, the time $t_0$ at which the contact occurred, and the distance x between the contact site and the sensor. However, generally, only the first is known. Thus the processor may be adapted to provide estimates or substitutes for $t_0$ and x which may be substituted into a calculation to remove the reflected waves. For example, an estimate for $t_0$ may be the time at which the contact was first detected by any sensor on the member, i.e. the time at which the measured signal first passes a predetermined threshold. The distance x may be set as the distance between the relevant sensor and the furthest point on the member or the maximum dimension (e.g. diameter) of the member. Use of these substitutes should leave the direct-path signal intact. Estimates of $t_0$ and x obtained by other means may also be used.

There may be multiple (i.e. n) sensors on the member and thus the number of distinct correlation functions is $n(n-1)/2$. The processor may be adapted to create a mapping function which maps the surface of the member for each correlation function whereby the dispersion corrected correlation function, G(t), is swept over the surface such that all co-ordinates of a given path-length difference, $\Delta x$, take the value $G(\Delta x/v)$. The product of the entire set of mapped correlation functions may then be calculated and the location of the contact may be determined from the maximum co-ordinate. This method has the desired property of increasingly rejecting spurious contributions from reflections as the number of sensors is increased.

Each sensor and its associated circuitry may have identical or different phase properties. Differences in the phase properties may be caused by mechanical inconsistencies in the manufacture and mounting of the sensors, or by finite tolerances of component values in the associated amplification and filtering circuits. If the phase properties of each sensor differ, the dispersion corrected correlation function may be convolved with some asymmetric function. This asymmetric function may lead to incorrect measurements of path-difference difference since the position of peaks in the dispersion corrected correlation function is no longer independent of the phase properties of the sensor.

The processor may thus be adapted to perform the following steps:

a) estimate a convolution correction coefficient $\phi_{12}(\omega)$ from $$\phi_{12}^*(\omega) = \left| \sum_j \hat{W}_{1,j}(\omega) \hat{W}^*_{2,j}(\omega) \exp[-ik(\omega)\Delta x_j] \right|$$

where and $\{\hat{W}_{1,j}(\omega)\}$ and $\{\hat{W}^*_{2,j}(\omega)\}$ are the Fourier transformation and complex conjugate Fourier transformation of two measured bending wave signals $\{W_{1,j}(t)\}$ and $\{W_{2,j}(t)\}$ and $\{\Delta x_j\}$ is the path-length difference;

b) calculate the dispersion corrected correlation function with phase correction from:

$$G(t) = \frac{1}{2\pi} \int_{-\infty}^{+\infty} \hat{W}_1[f(\omega)] \hat{W}_2^*[f(\omega)] \phi_{12}[f(\omega)] \exp(i\omega t) d\omega.$$

The phase correction has the effect of deconvolving the dispersion corrected correlation function such that the position of the maximum is consistent with the position of the contact.

The processor may further be adapted to include in the determination procedure any available information about where the contact can be expected. This may be particularly useful in situations where the position of a contact may not be unambiguously determined by the dispersion corrected correlation functions, e.g. when reflected waves interfere with the direct-wave signature or less than three sensors are used. For example, if the member is an input device for a graphical user interface where the user is presented with a choice of 'buttons' to press, it may be useful to assume that any contact on the member occurs within the discrete areas corresponding to the buttons.

Alternatively, a map of the probability at which a contact is likely to occur and which is based on the expected behaviour of the user may be used. The device may comprise a software application with a graphical user interface (GUI) which interacts with the operating system by means of an application program interface (API) in which the API is adapted to generate the probability map. The probability map may be based on the location, size, and frequency of use of objects presented by the graphical user interface. The probability map may also be based on information about the relative likelihood of the various GUI elements being activated.

The information in the mapped correlation functions may be combined with the probability map to give higher reliability. The expected probability may also be a further input to a neural-net which accepts information derived from the sensors.

The member may comprise a raised pattern on its surface whereby a contact drawn across the surface provides a variable force to the member to generate bending waves in the member. The pattern may be periodic, or quasi-periodic with a statistically well-defined spatial distribution of undulations. The processor may be adapted to determine the contact position by using knowledge of the periodicity of the pattern and the fact that the interval between impulses represents the time in which a contact, which may be provided by a stylus, has travelled to an adjacent feature of the pattern. The pattern may be random whereby a contact travelling over the surface of the member generates a random bending wave signal.

The use of random surface pattern may be used independently of the dispersion correction correlation function. Thus according to another aspect of the invention, there is provided a contact sensitive device comprising a member capable of supporting bending waves, a sensor mounted on the member for measuring bending wave vibration in the member to determine a first measured bending wave signal and a processor which calculates information relating to the contact from the measured bending wave signal from the sensor, characterised in that a surface of the members comprises a raised pattern whereby a contact drawn across the surface provides a variable force to the member to generate bending waves in the member.

The device may comprise sensing means to determine a second measured bending wave signal which is measured simultaneously with the first measured bending wave signal and the processor may calculate information relating to the contact from a dispersion corrected correlation function of the two measured bending wave signals. The dispersion corrected correlation function is described above and thus features of the first and second embodiments may be applied to this embodiment. The dispersion corrected correlation function is particularly useful if the measured bending wave signals have a large bandwidth centred on a frequency which gives a phase-velocity of bending waves in the member which is much greater than the maximum lateral velocity of the contact.

According to another aspect of the invention, there is provided a contact sensitive device comprising a member capable of supporting bending waves, a sensor mounted on the member for measuring bending wave vibration in the member to determine a first measured bending wave signal and a processor which calculates information relating to a contact from the measured bending wave signal from the sensor, characterised in that the device comprises at least a second sensor to determine a second measured bending wave signal which is measured simultaneously with the first measured bending wave signal and the processor optimises a product of a set of corrected impulse response measurements from each sensor to determine information related to the contact.

The information calculated may be the time $t_0$ at which contact occurs and thus the form of the dispersion relation, $k(\omega)$, and the distance, x, separating each sensor from the contact site must be known. The corrected impulse response measurement may be calculated by using the following steps:
1) Calculate the Fourier transform $\hat{W}(\omega)$ of a measured bending wave signal W(t);
2) Calculate an equivalent response, W'(t), from a notional sensor positioned at the contact site by $$\hat{W}'(\omega) = \hat{W}(\omega) \exp[ik(\omega)x].$$

3) Calculate the inverse Fourier transform of $\hat{W}'(\omega)$ to provide function W'(t).

The product is thus $\Pi_j W'_j(t)$ in which the function W'(t) shows an initial impulse from the contact which is without dispersion and which is centred at $t_0$, the time of the impulse. Features in W(t) due to edge reflections will appear later in W'(t) but will not be corrected for dispersion in the same way as for the direct impulse which is thus more easy to identify.

The product shows a strong peak due to the direct impulse, and a weak background noise. By taking the product we reinforce the signal coincident at $t_0$ in all $W'_j(t)$, whereas the information due to reflections is uncorrelated and suppressed. This procedure is therefore a reliable way of determining $t_0$.

Conversely, the information relating to the contact may be the location of the contact, i.e. the co-ordinate r and thus the sensor-contact distances, $x_j$ and the time $t_0$ for which the maximum value of $\Pi_j W'_j(t_0)$ is obtained must be known.

This optimisation process may involve iterative refinement of estimates for r and $t_0$. The initial estimate may be derived from impulse response functions whose high temporal frequency components have been suppressed, with the result that the estimate is easy to obtain (fewer local maxima), but of low spatial precision. Further iterations may introduce progressively higher frequency components as the estimate is refined.

The invention therefore provides two complementary methods of determining the contact position: the method of dispersion-corrected correlation functions, and the method of maximising $\Pi_j W'_j(t_0)$.

The following characteristics may apply to all embodiments of the invention. The device may comprise means for recording measured bending wave signals from the or each sensor over time as the contact moves across the member. The measured bending wave signals may be recorded as time-series data, i.e. a sequence of values measured at different times.

The time-series data may be analysed as a sequence of short sections or 'frames' of data, which may have widths or durations of 10 ms. The processor may apply a window function to the frames of data. Window functions are well known in the art—see for example Press W. H. et al., Numerical Recipes in C, 2 Ed., Cambridge University Press 1992, Ch. 13.4. The processor may be adapted to extract information on the contact which has been averaged over the duration of the frame, e.g. the mean positional co-ordinate of the moving contact. The processor may apply the dispersion corrected correlation technique to calculate the mean path length difference for each frame of data to give a sequence of path-length differences over time.

Alternatively, the time-series data may be analysed using adaptive filters such as those described in Grant P M et al "Analogue and Digital Signal Processing and Coding", Ch 10 (1989). The adaptive filter may correct for a convolution function which relates the time-series data from the first and second measured bending wave signals. The convolution function changes slowly over time as the contact moves and is dependent on the position of the contact.

The adaptive filter may calculate a convolution correction which when applied to the measured bending wave signals produces a signal as close as possible to the measurement input. The first measured bending wave signals form a first time-series data which may be sent to the reference signal of the adaptive filter and the second measured bending wave signals form a second time-series data which may be delayed, preferably by the maximum expected width of the correlation function, before being sent to the primary input of the adaptive filter whereby the convolution correction may be calculated. The processor may apply the dispersion correction to the convolution function to give a function whose maximum is determined by the difference between the path-length from contact to the sensor and the path-length from the contact to the sensing means.

The information calculated may be the location of the contact or may be other information, e.g. pressure or size of the contact. The information relating to the contact may be calculated in a central processor. The sensors may be mounted at or spaced from an edge of the member. The sensors may be in the form of sensing transducers which may convert bending wave vibration into an analogue input signal.

The member may be in the form of a plate or panel. The member may be transparent or alternatively non-transparent, for example having a printed pattern. The member may have uniform thickness. Alternatively, the member may have a more complex shape, for example a curved surface and/or variable thickness. The processor may be adapted for complex shaped members by providing an adaptive algorithm such as a neural net to decipher the contact location from the bending wave signal received by the sensor.

The device may be a purely passive sensor with the bending wave vibration and hence the measured bending wave signals being generated by an initial impact or by frictional movement of the contact. Alternatively, the device may be an active sensor and thus the device may comprise an emitting transducer. The transducer may have dual functionality, namely acting as an emitting transducer and a sensor. The member may also be an acoustic radiator and bending wave vibration in the member may be used to generate an acoustic output.

Measurements of the bending wave signal due to a contact may be contaminated by the bending waves due to the audio signal, particularly when the audio signal is similar to the bending wave signal generated by the contact. The effect may be minimised by ensuring the frequency band of the audio signal differs from and does not overlap the frequency band of the measurements from the sensors and sensing means. The audio and measured signals may thus be filtered, for example, the audio band may be limited to frequencies below 20 kHz, and the vibration measurements may be limited to frequencies above 20 kHz.

The device may be a dual active and passive sensor and may be adapted to switch between active and passive sensing modes depending on whether contact is applied to the device. The device may cycle between resting in passive sensing mode when no contact is detected, switching to active mode sensing when a contact is applied and returning to passive sensing mode once the contact is removed to wait for further contacts. This may be advantageous to avoid the power drain when the device is in active mode.

The contact may be in the form of a touch from a stylus which may be in the form of a hand-held pen. The movement of a stylus on the member may generate a continuous signal which is affected by the location, pressure and speed of the stylus on the member. The stylus may have a flexible tip, e.g. of rubber, which generates bending waves in the member by applying a variable force thereto. The variable force may be provided by tip which alternatively adheres to or slips across a surface of the member. As the tip moves across of the member a tensile force may be created which at a certain threshold, causes any adhesion between the tip and the member to break, thus allowing the tip to slip across the surface.

Alternatively, the contact may be in the form of a touch from a finger which may generate bending waves in the member which may be detected by passive and/or active sensing. The bending waves may have frequency components in the ultrasonic region (>20 kHz). Passive sensing is therefore sensitive to contacts with both fingers and styli.

When the device is acting as an active sensor, i.e. with an emitting transducer generating an excitation signal, the contact may exert a non-linear force on the member so as to generate harmonics of the excitation signal. The processor may comprise signal processing devices to isolate the excitation signal from the harmonics so that the harmonics may used to determine the contact position in a similar manner to passive sensing. The harmonics effectively constitute a source of bending waves from the contact site.

The or each emitting transducer or sensor may be a bender transducer which is bonded directly to the member, for example a piezoelectric transducer. Alternatively, the or each emitting transducer or sensor may be an inertial transducer which is coupled to the member at a single point. The inertial transducer may be either electrodynamic or piezoelectric. It may be possible to use audio transducers which are already in place as sensing and/or emitting transducers.

A contact sensitive device according to the invention may be included in a mobile phone, a laptop or a personal data assistant. For example, the keypad conventionally fitted to a mobile phone may be replaced by a continuous moulding which is touch sensitive according to the present invention. In a laptop, the touchpad which functions as a mouse controller may be replaced by a continuous moulding which is a contact sensitive device according to the invention. The moulding may be implemented as a mouse controller or other alternatives, e.g. a keyboard. Alternatively, the contact sensitive device may be a display screen, e.g. a liquid crystal display screen comprising liquid crystals which may be used to excite or sense bending waves. The display screen may present information relating to the contact.

BRIEF DESCRIPTION OF DRAWINGS

The invention is diagrammatically illustrated, by way of example, in the accompanying drawings, in which:

FIGS. 1a to 1d are a graphic illustration of a method of dispersion correction according to the prior art, in which FIG. 1a is a graph of a dispersive impulse response showing response in arbitrary units against time. FIG. 1b is a graph of a dispersive frequency response showing response in arbitrary units against frequency. FIG. 1c is a graph of a non-dispersive frequency response showing response in arbitrary units against frequency. FIG. 1d is a graph of a non-dispersive impulse response showing response in arbitrary units against time;

FIG. 16b is a method of separating audio signal and measured bending wave signal in the device of FIG. 16a;

FIG. 2 shows a contact sensitive device (10) comprising a transparent touch sensitive plate (12) mounted in front of a display device (14). The display device (14) may be in the form of a television, a computer screen or other visual display device. A stylus (18) in the form of a pen is used for writing text (20) or other matter on the touch sensitive plate (12).

The transparent touch sensitive plate (12) is a member, e.g. an acoustic device, capable of supporting bending wave vibration. Three transducers (16) are mounted on the plate (12). At least two of the transducers (16) act as sensors or sensing means and are thus sensitive to and monitor bending wave vibration in the plate. The third transducer (16) may also be a sensing transducer so that the system corresponds to the passive contact sensitive device of FIG. 3 or FIG. 4.

Figure 5:
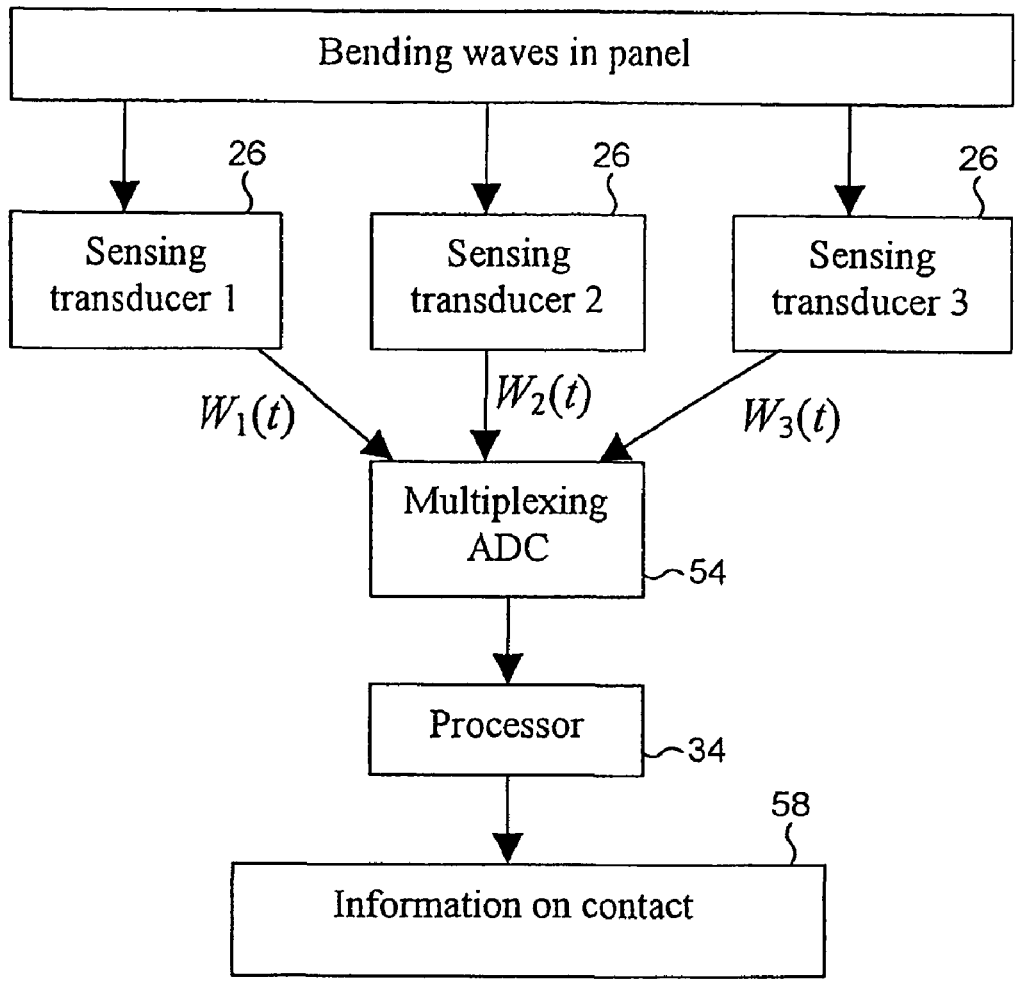
FIG. 5 is a block diagram of a processing algorithm for the passive sensing of FIGS. 3 and 4.

Alternatively, the third transducer may be an emitting transducer for exciting bending wave vibration in the plate so that the system corresponds to the active sensor of FIG. 5. In the FIG. 6 or FIG. 7 embodiment, the active sensor may act as a combined loudspeaker and contact sensitive device.

Figure 1A:
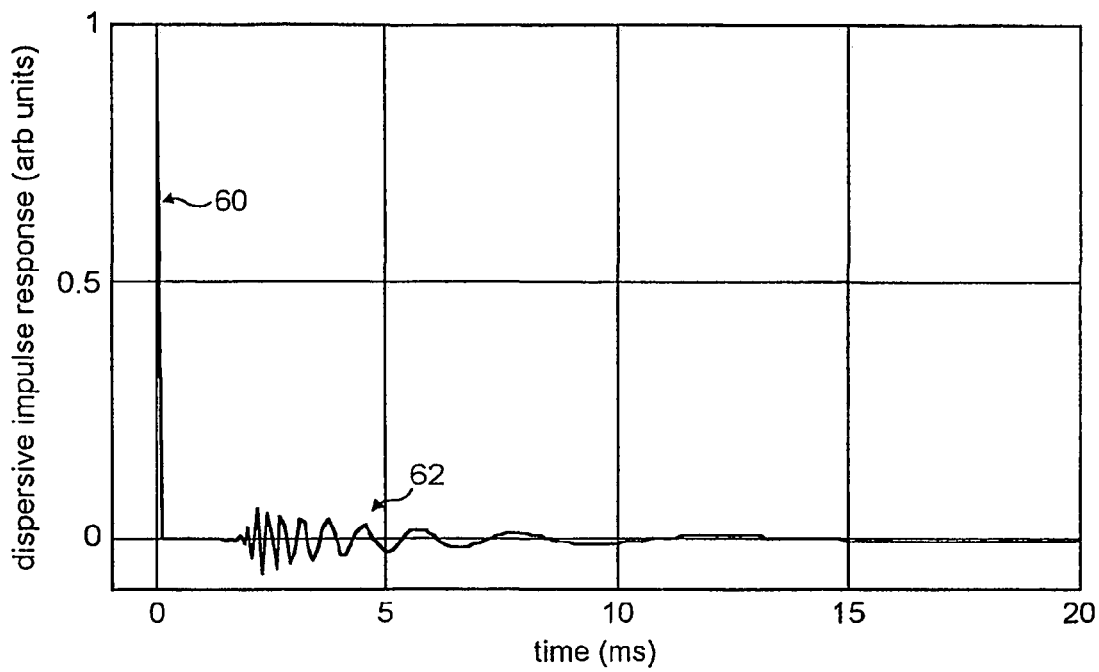
Figure 1B:
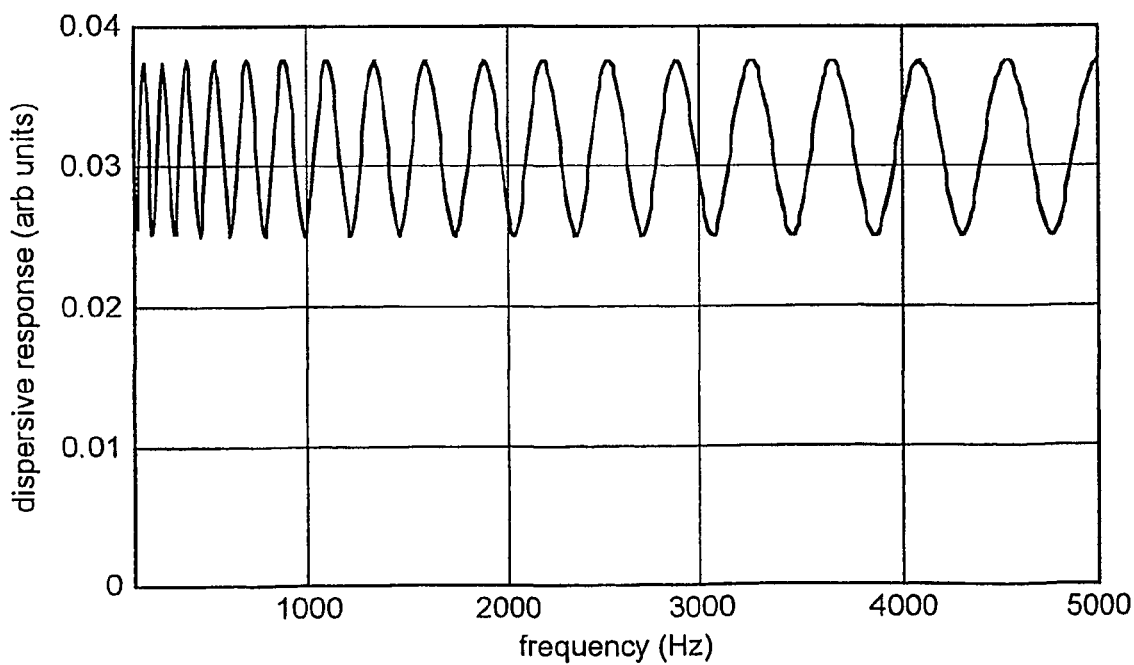
Figure 1C:
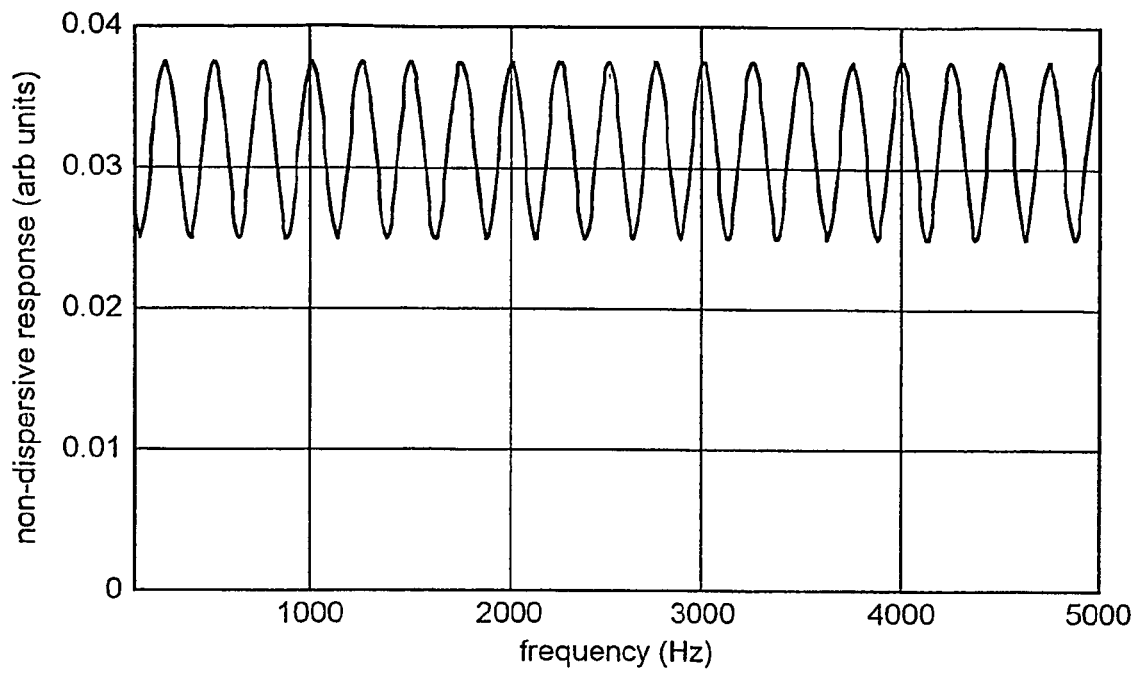
Figure 1D:
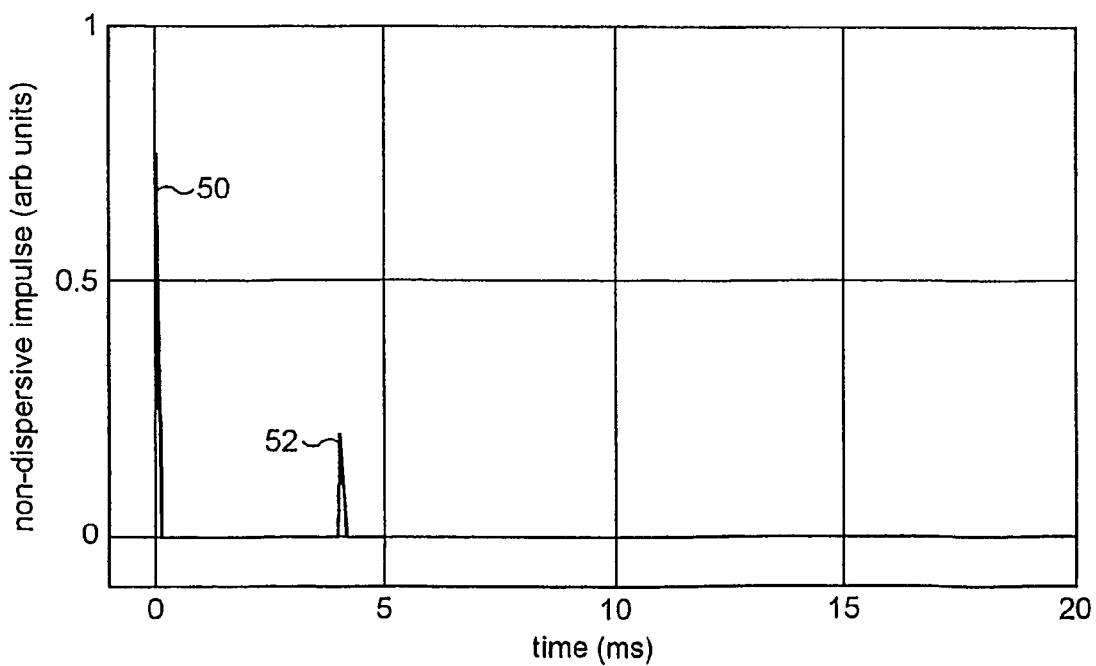
Figure 2:
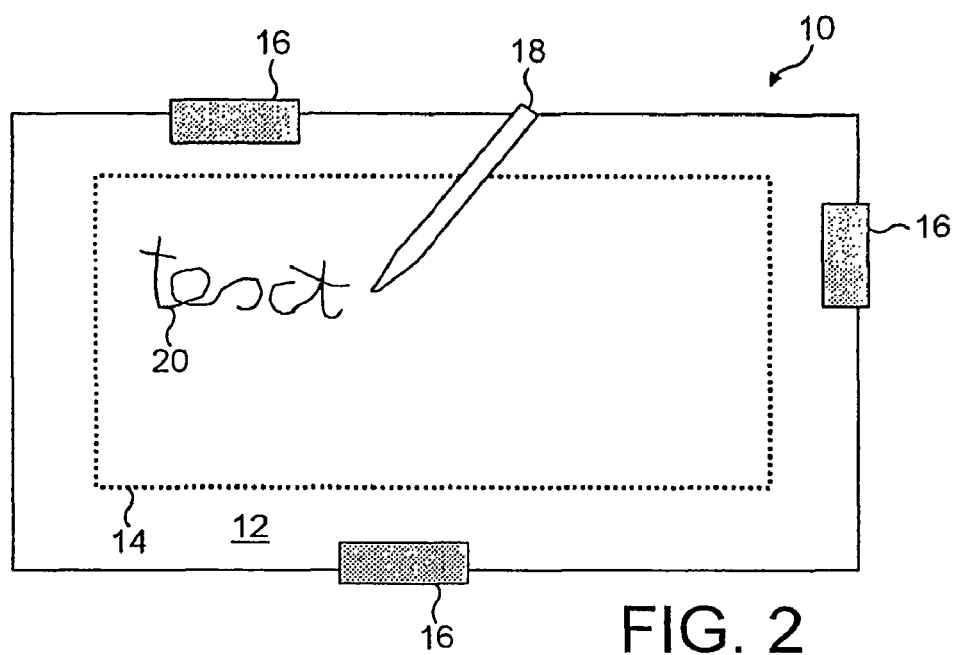
FIG. 2 is a plan view of a contact sensitive device according to the present invention.
Figure 3:
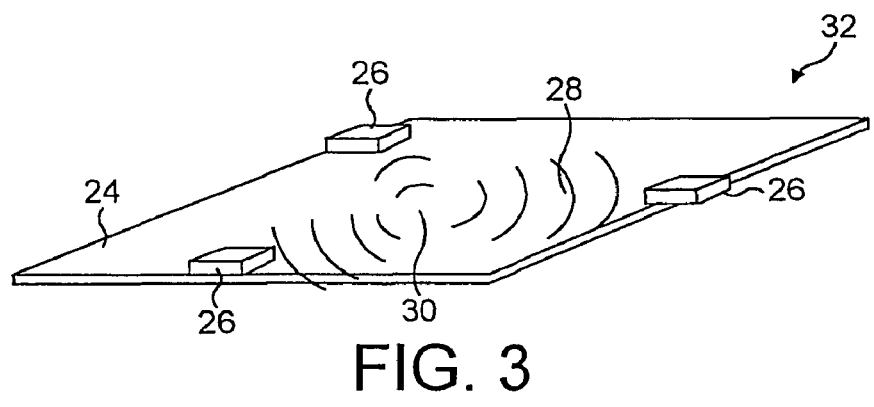
FIG. 3 is a perspective view of a first device incorporating passive touch sensing.
Figure 4:
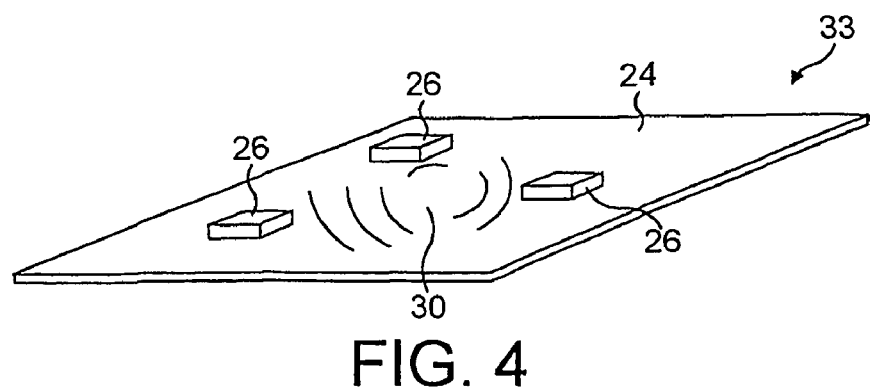
FIG. 4 is a perspective view of a second device incorporating passive touch sensing.

FIGS. 3 and 4 are more detailed illustration of two contact sensitive devices (32,33). The contact sensitive devices (32, 33) comprises a member in the form of a panel (24) capable of supporting bending wave vibration and three sensors in the form of sensing transducers (26) for sensing bending wave vibration at their respective mounting points. The vibration pattern (28) is created when pressure is applied at a contact point (30). The devices may be considered to be passive contact sensitive devices since the devices do not comprise an emitting transducer. Thus the bending wave panel vibration in the panel is generated solely by the contact.

In a passive sensor an impulse in the body of the panel (24) starts a bending wave travelling towards the edge of the panel (24). The bending wave is detected by the three sensing transducers (26) mounted equidistantly around the edges as in FIG. 3 or by the three sensing transducer mounted on a surface of the panel (24) but spaced from the edges of the panel (24) as in FIG. 4. The measured bending wave signals are processed to determine the spatial origin and force profile of the applied impulse.

FIG. 5 shows a possible implementation for the processing of the bending wave information sensed at each sensing transducer (26) of FIG. 3 or FIG. 4. In FIG. 5, the bending waves in the panel are sensed by three sensing transducers (26). The sensing transducers (26) measure analogue bending wave signals $W_1(t)$, $W_2(t)$ and $W_3(t)$ which are transmitted to a multiplexing analogue to digital converter (ADC) (54). The resultant digital input signal is transmitted to the central processor (34) from which information (58) relating to the location and profile of the contact impulse is determined.

Figure 6:
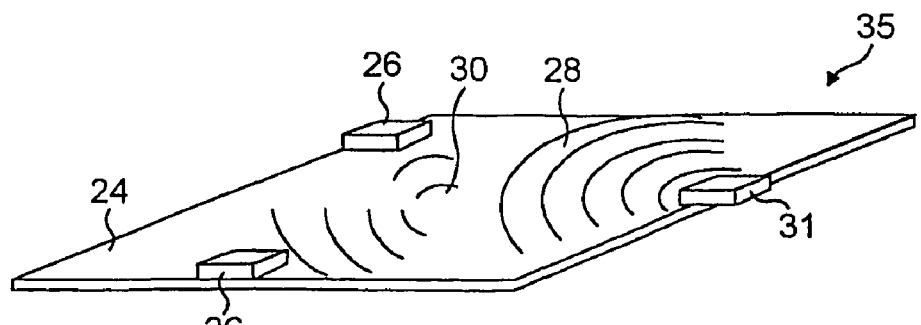
FIG. 6 is a perspective view of first device incorporating active touch sensing.
Figure 7:
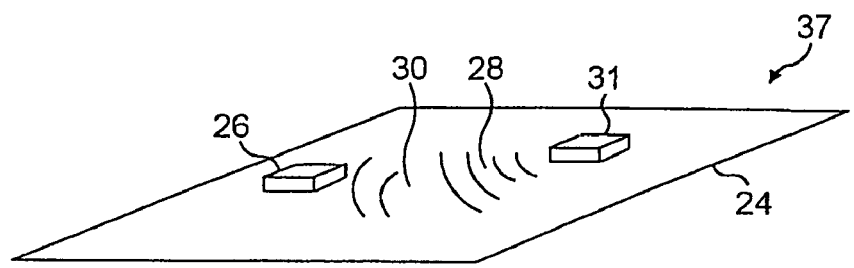
FIG. 7 is a perspective view of a second device incorporating active touch sensing.

FIGS. 6 and 7 are more detailed illustrations of alternative combined touch sensitive and audio devices (35,37). The devices each comprise a panel (24) capable of supporting bending wave vibration and an emitting transducer (31) for exciting bending wave vibration in the panel (24). The device (35) in FIG. 6 further comprises two sensing transducers (26) for sensing bending wave vibration at their respective mounting points whereas the device (37) in FIG. 7 comprises only one sensing transducer (26). The vibration pattern (28) is interrupted when pressure is applied at a contact point (30). The devices may be considered to be active contact sensitive devices since the devices comprise an emitting transducer (31).

In FIG. 6, the sensing and emitting transducers (26,31) are spaced equidistantly around the edges of the panel (24) whereas in FIG. 7, the sensing and emitting transducers (26, 31) are distanced from the edges of the panel (24) and are mounted to a surface thereof.

Figure 8:
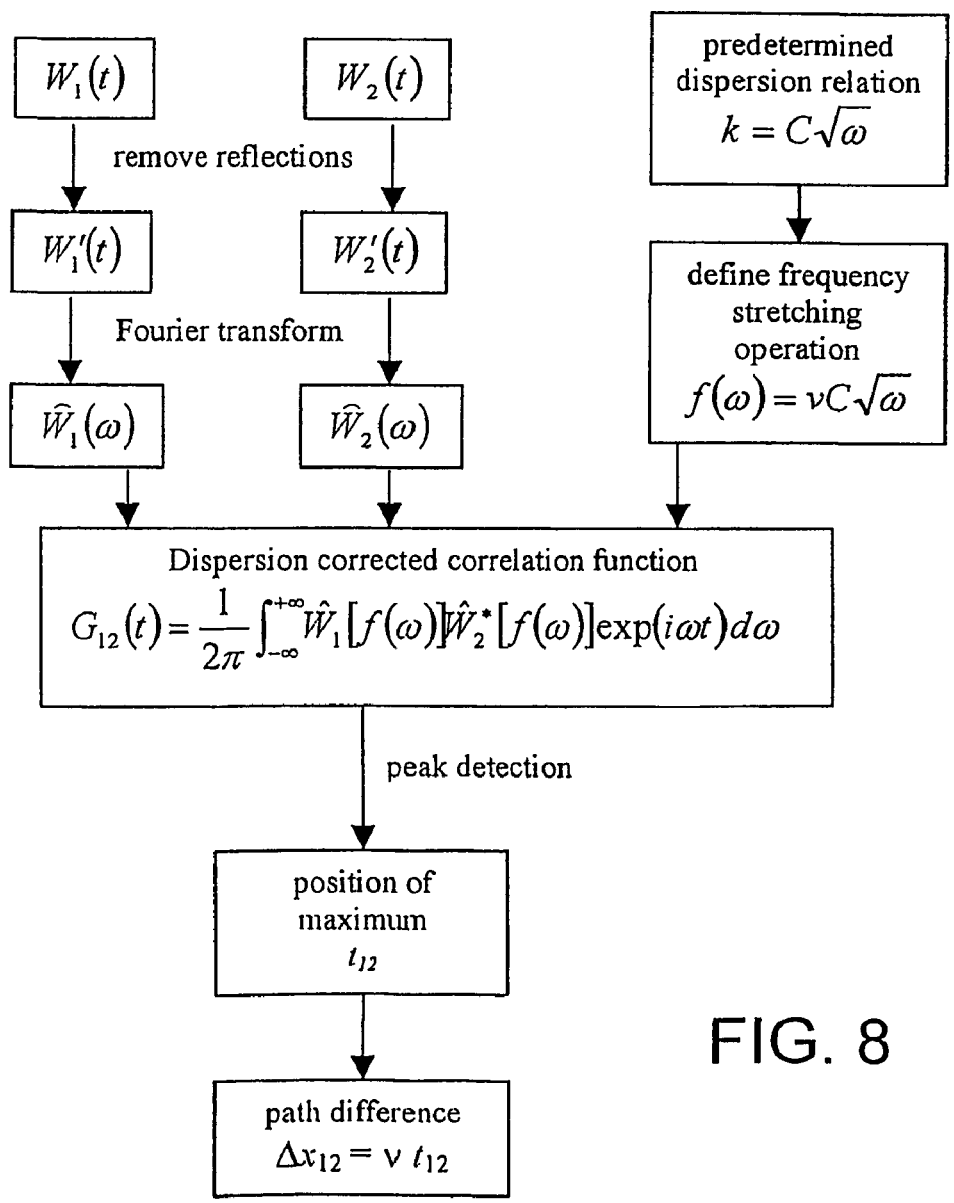
FIG. 8 is a flow chart showing a method of calculating the path-length difference between the contact and two measurement points using the dispersion corrected correlation function.
Figure 8A:
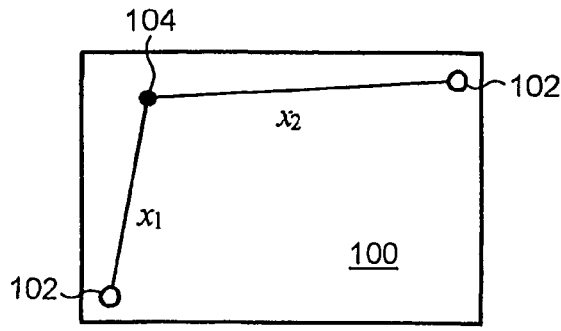
FIG. 8a is a schematic plan view of a device to which the method of FIG. 8 is applied.
Figure 8B:
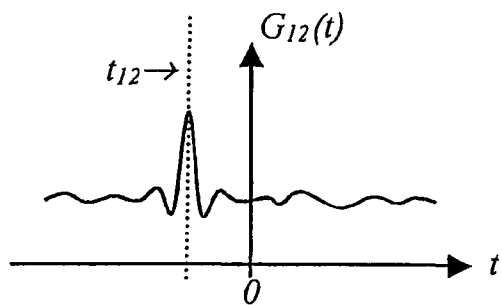
FIG. 8b is a graph of dispersion corrected correlation function against time.

FIG. 8a shows an embodiment having two sensors (102) mounted on a member (100) to which a contact is applied at a contact location (104). FIG. 8 shows a method of calculating the dispersion corrected correlation function to reveal the difference in path length between the contact location (104) and the sensors (102). The method comprises the following steps:

(a) Measure two bending wave signals $W_1(t)$ and $W_2(t)$;
(b) Remove reflections from the measured signals and calculate $W'_1(t)$ and $W'_2(t)$, e.g. by using the method set out in FIG. 9;
(c) Calculate the Fourier transform of $W'_1(t)$ and $W'_2(t)$ to arrive at $\hat{W}_1(\omega)$ and $\hat{W}_2(\omega)$ and hence the intermediate function $\hat{W}_1(\omega)\hat{W}_2^*(\omega)$; where $\hat{W}_2^*(\omega)$ is the complex conjugate Fourier transform.
(d) and (e) at the same time as performing steps (a) to (c), the frequency stretching operation $f(\omega)=vC\sqrt{\omega}$ is calculated using the predetermined panel dispersion relation $k=C\sqrt{\omega}$.
(f) $\hat{W}_1(\omega)$ and $\hat{W}_2(\omega)$ and $f(\omega)=vC\sqrt{\omega}$ are combined to arrive at the dispersion corrected correlation function:

$$G(t) = \frac{1}{2\pi}\int_{-\infty}^{+\infty} \hat{W}_1[f(\omega)]\hat{W}_2^*[f(\omega)]\exp(i\omega t)d\omega;$$

and
(g) the dispersion corrected correlation function is plotted against time with a peak occurring at time $t_{12}$ as shown in FIG. 8b;
(h) $\Delta x_{12}$ is calculated from $t_{12}$; $\Delta x_{12}$ is the path-length difference between the path lengths $x_1$ and $x_2$ from the first and second sensors to the contact.
(i) $\Delta x_{12}$ is used to calculate the location of the contact.

Alternatively at step (e), the dispersion corrected correlation function with phase correction $\phi_{12}$ set out below may be used. The calculation of $\phi_{12}$ is explained in FIG. 13.

$$G(t) = \frac{1}{2\pi}\int_{-\infty}^{+\infty} \hat{W}_1[f(\omega)]\hat{W}_2^*[f(\omega)]\phi_{12}[f(\omega)]\exp(i\omega t)d\omega$$

Figure 9:
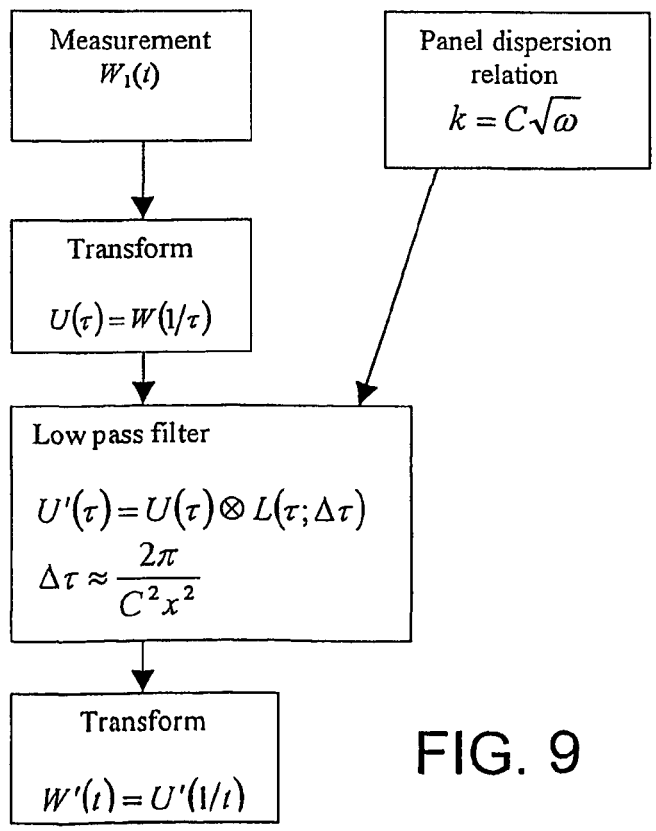
FIG. 9 is a flow chart showing a first method of removing reflections from a measured bending wave signal.

FIG. 9 shows a method of removing reflections from an impulse measurement where the impulse occurs at t=0. The method comprises the following steps:
i) Measure a bending wave signal $W_1(t)$;
ii) Transform the signal on the time axis by using $U(\tau)=W(1/\tau)$;
iii) A low pass filter is applied, for example, $U'(\tau)$ as shown to remove all reflected signals. The constant C from the predetermined panel dispersion relation $k=C\sqrt{\omega}$ is used to define the width of the convolution function $\Delta\tau$;
iv) The response may then be transformed back to linear units of time, as $W'(t)=U(1/t)$.

Figure 10:
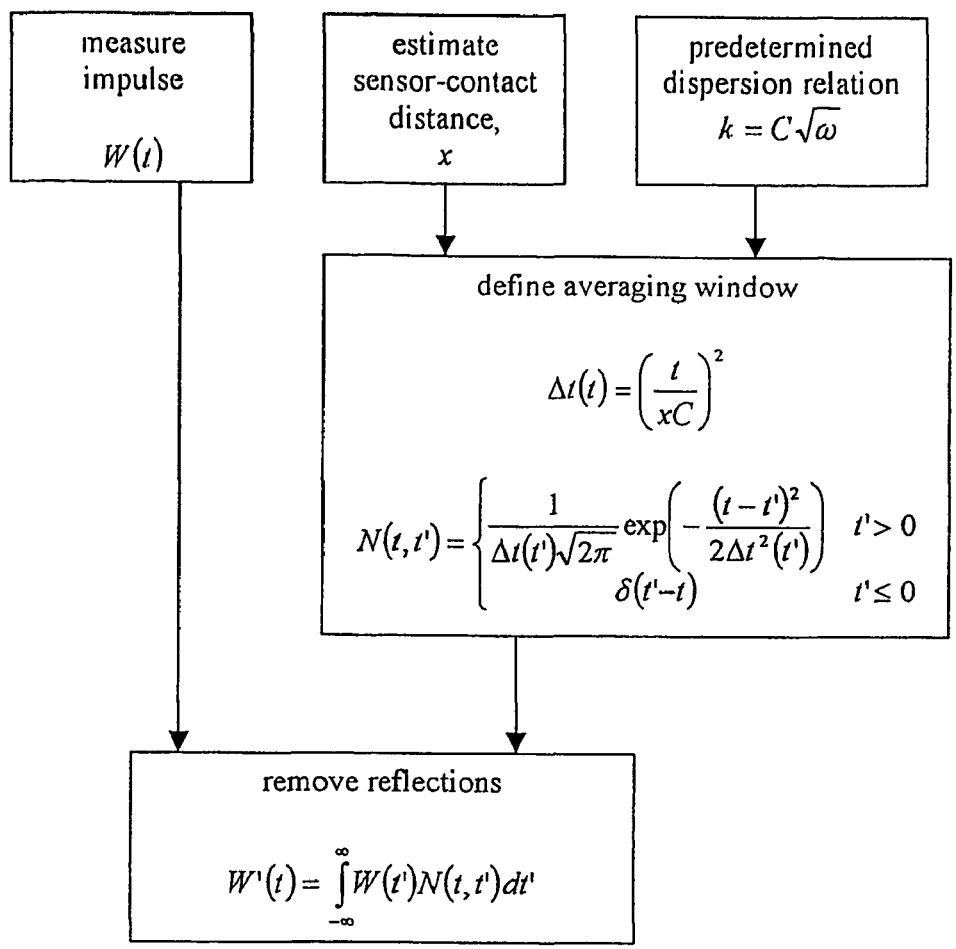
FIG. 10 is a flow chart showing a second method of removing reflections from a measured bending wave signal.

FIG. 10 shows an alternative method for removing reflections from an impulse measurement where the impulse occurs at t=0. The method comprises the following steps:

i) Measure a bending wave signal $W_1(t)$;
ii) Estimate the distance x between each sensor and the location of the contact;
iii) Use the estimate x and a predetermined dispersion relation $k=C\sqrt{\omega}$ to define an averaging window $N(t, t')$
iv) Apply the averaging window $N(t,t')$ to the bending wave signal $W_1(t)$ to remove the effect of reflections.

$N(t,t')$ is an example of an averaging window with a Gaussian shape. A rectangular window can be implemented to give computational efficiency. Multiple applications of a rectangular window may be desirable; a large number of repeated applications of a rectangular window will produce a similar result to $N(t, t')$.

Figure 11A:
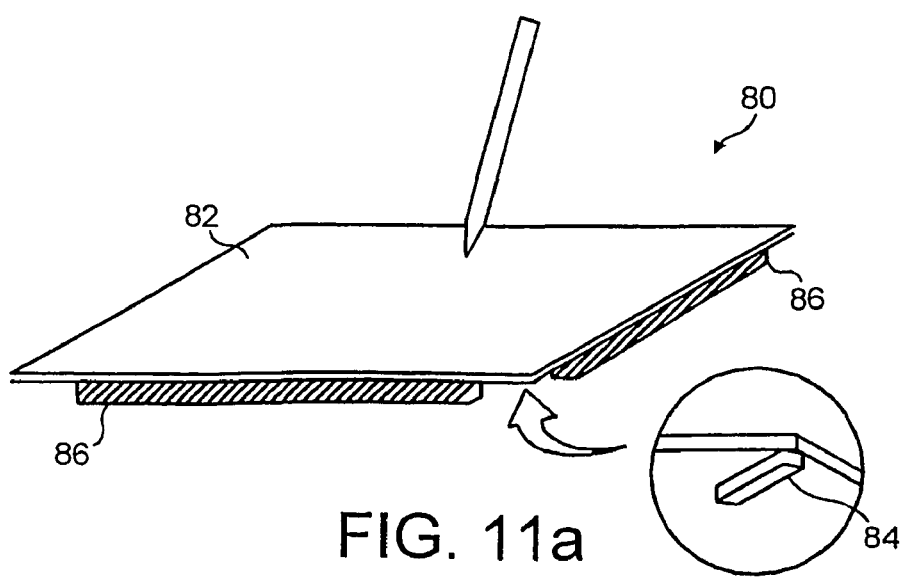
FIGS. 11a and 11b are schematic perspective and plan views of a touch sensitive device according to another aspect of the invention.
Figure 11B:
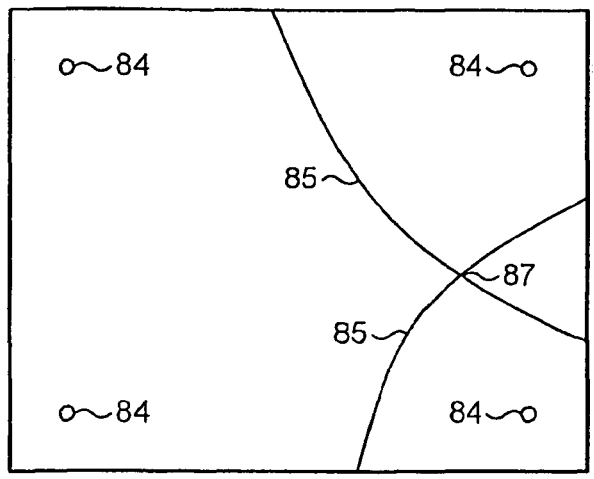

FIGS. 11a and 11b show a contact sensitive device (80) comprising a rectangular member (82) capable of supporting bending waves and four sensors (84) for measuring bending wave vibration in the member. The sensors (84) are in the form of piezoelectric vibration sensors and are mounted on the underside of the member (82), one at each corner. A foam mounting (86) is attached to the underside of the member and extends substantially around the periphery of the member. The foam mounting (86) has adhesive surfaces whereby the member may be securely attached to any surface. The foam mounting may reduce the reflections from the edge of the member.

Two sets of path length differences, $\Delta x_{12}=x_1-x_2$ and $\Delta x_{34}=x_3-x_4$ are calculated as described in FIG. 8; $x_i$ is the distance from each sensor to the contact. As shown in FIG. 11b the hyperbolae (85) defined by the two path-length differences are plotted and the location of the contact is the intersection (87) of two hyperbolae.

Figures 12, 12A, 12B:
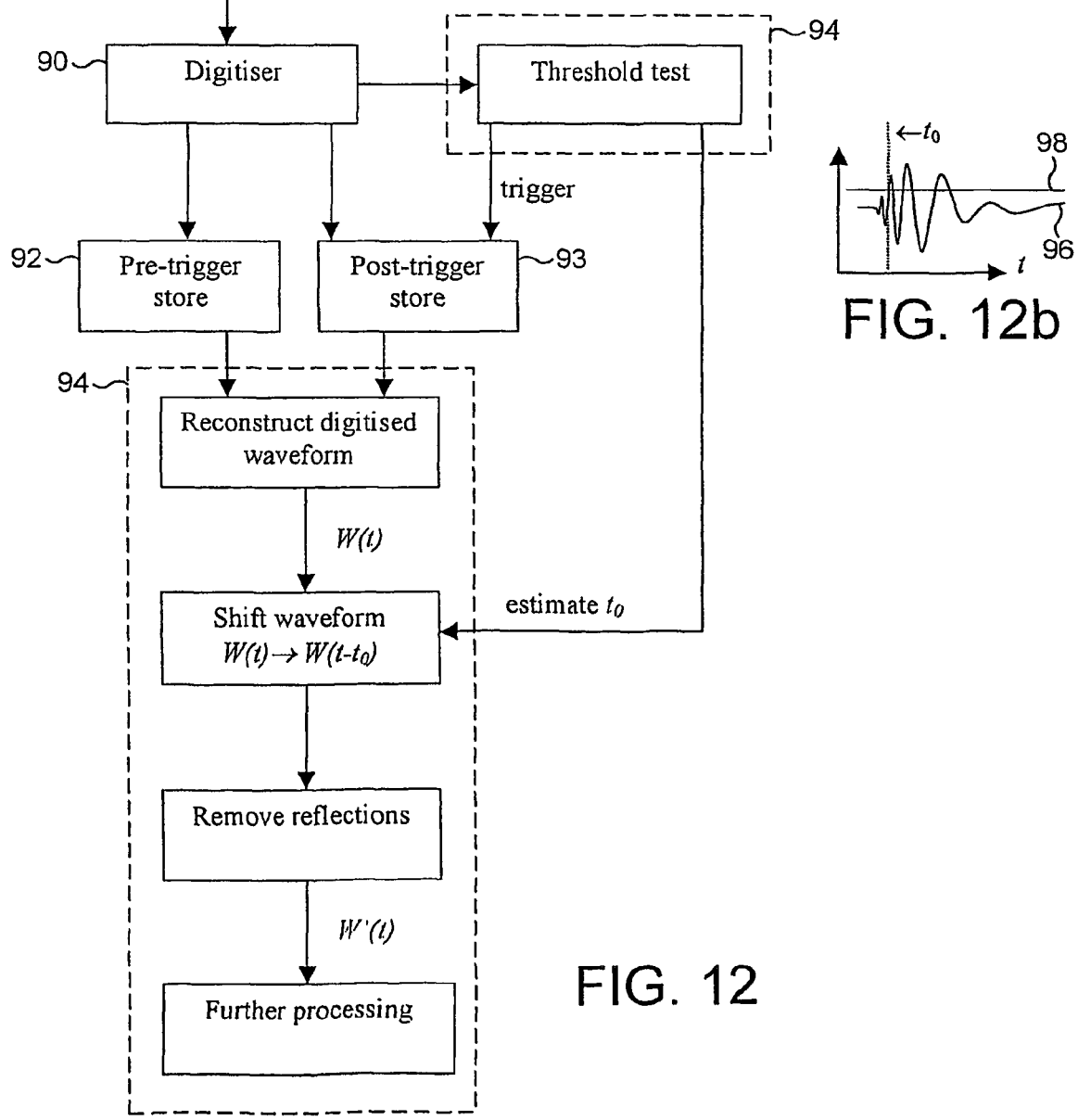
FIG. 12 is a schematic block diagram of a processing algorithm which may be used for the device of FIG. 11.
FIG. 12a is a graph showing the combined transfer function H(f) against frequency (f) for the filter and amplifier of FIG. 12.
FIG. 12b is a graph of a measured bending wave signal against time.
Figure 13A:
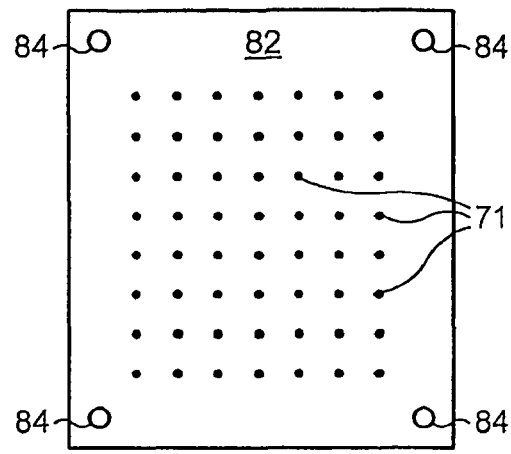
FIG. 13a is a plan view of a grid defined on a member for use in the method of FIG. 13.

FIG. 12 is a schematic diagram illustrating the implementation of a processing algorithm in the device of FIG. 11. The sensors (84) measure analogue bending wave signals $W_1(t)$, $W_2(t)$ and $W_3(t)$ which are passed through an amplifier and anti-aliasing (low-pass) filter (88). The amplitude of the combined transfer function H(t) of the amplifier and anti-aliasing filter is shown in FIG. 12a. The filtered signals are converted into digital signals by a digitiser (90) and stored in a first-in-first-out buffer having finite length. The buffer comprises two stores, a pre-trigger and a post-trigger store (92,93) for signals measured before and after the detection process is triggered respectively.

The central processor (94) determines information relating to the location and profile of a contact of the member by the following steps:
a) The central processor performs a threshold test which is illustrated in FIG. 12b. The measured bending wave signal (96) is compared to a predetermined threshold value (98). When the measured signal passes the threshold value, the detection process is triggered.
b) An array of time-series digital input signals is transferred from the buffer to the processor. The signals include measurements taken before and after the detection process is triggered so that a digital measure of the entire waveform of the impulse from the contact is reconstructed.
c) The processor shifts the waveform according to the estimate of $t_0$ so that $t_0$ is set to zero.
d) The processor removes the effect of reflections from the digitised signal as described above with the estimate of $t_0$ as zero and the estimate of x taken as the diagonal length of the member.
e) The processor applies further processing, in particular calculating the dispersion corrected correlation function for each diagonally opposed pair of sensors and calculating information relating to the contact.

Figure 13:
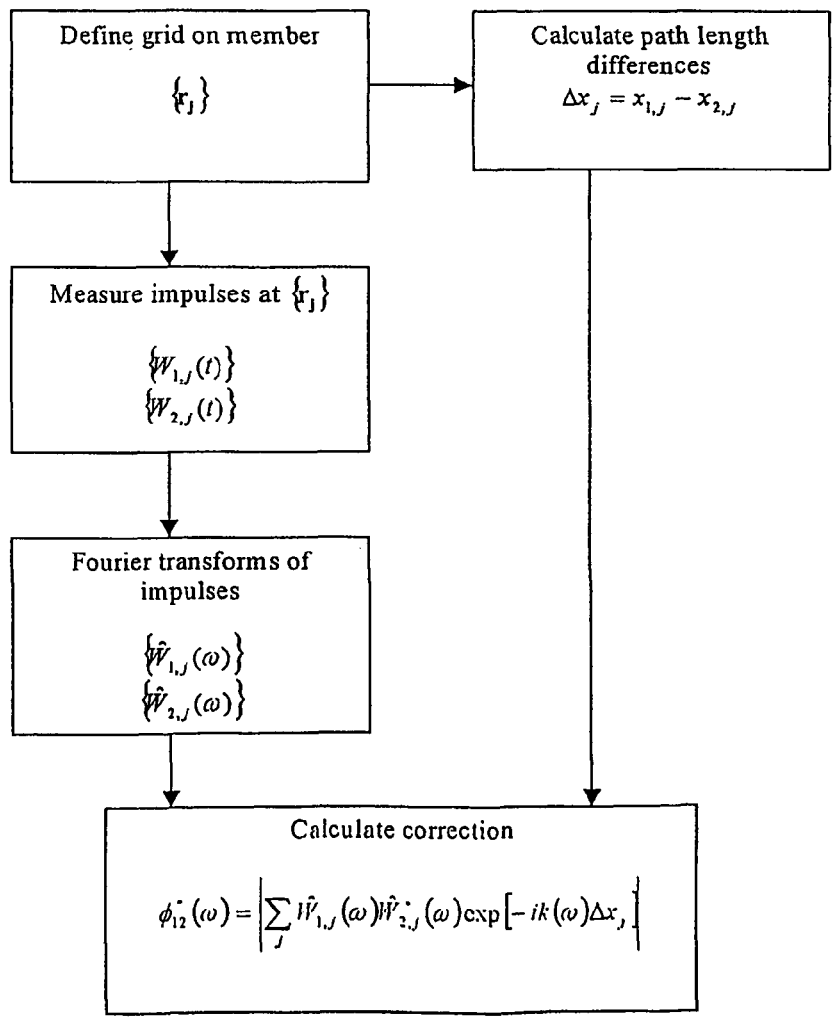
FIG. 13 is a flow chart of the steps for obtaining an empirical phase correction.

The further processing applied by the processor may also comprise applying a pre-determined phase correction to the dispersion corrected correlation function. This may be calculated as shown in FIG. 13.

a) Define a grid—for example, for the embodiment shown in FIGS. 11a and 11b which has a member (82) which four sensors (84), this may be done by defining points (71) by the vector $\{r_j\}$. In this example the grid has 8 rows and 7 columns so the grid is defined by a set of 56 vectors $[r_1, r_2 \ldots r_{56}]$.

b) A user taps on the first point (71) in the grid defined by $r_1$ and the first and second bending wave signals $\{W_{1,j}(t)\}$ and $\{W_{2,j}(t)\}$ are measured by the first and second sensor of each pair of sensors;

c) Step (b) is repeated until the user has tapped on each point in the grid;

d) Calculate the Fourier transforms of the bending wave signals;

e) Calculate the empirical phase correction:

$$\phi_{12}^*(\omega) = \left| \sum_j \hat{W}_{1,j}(\omega) \hat{W}_{2,j}^*(\omega) \exp[-ik(\omega)\Delta x_j] \right|$$

where $\Delta x_j$ is the difference between the path lengths, $x_{1,j}$ & $x_{2,j}$ from the first and second sensors to the contact. The path lengths are known from the grid coordinates.

Figure 14:
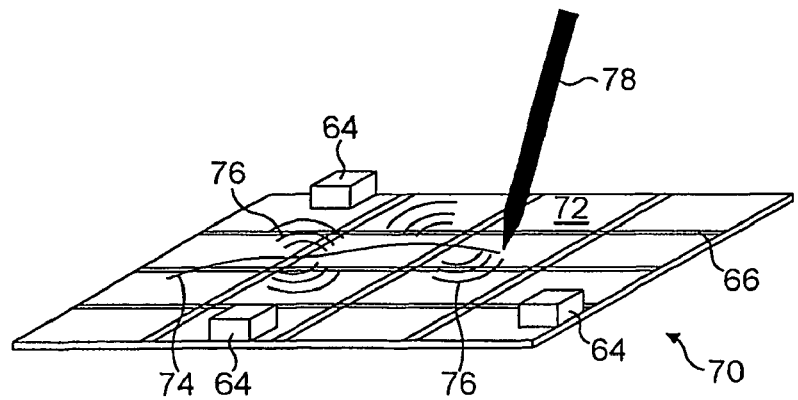
FIG. 14 is a touch sensitive device according to another aspect of the invention.

FIG. 14 shows a contact sensitive device (70) comprising a member (72) capable of supporting bending waves and three sensors (64) mounted on the member for measuring bending wave vibration in the member. A surface of the member (72) comprises a raised pattern (66) which is a periodic pattern of raised crossed lines. A stylus (78) is drawn across the surface along a path (74) and as it crosses a line of the pattern it generates bending waves (76) in the member.

Figure 15:
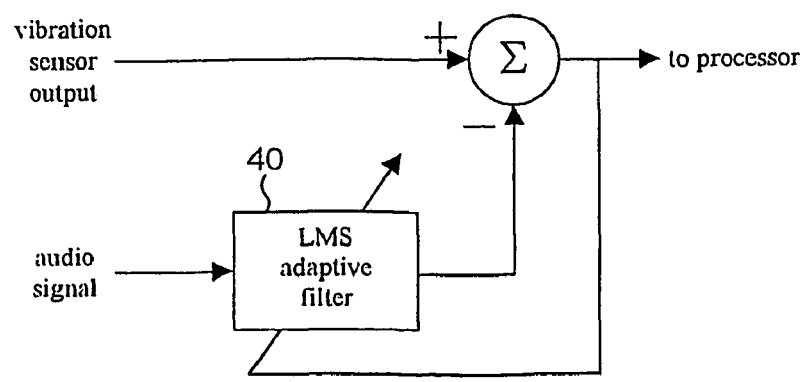
FIG. 15 is a circuit diagram of an adaptive noise canceller which may be used in the various devices.

FIG. 15 shows an adaptive noise canceller for example as described in "Widrow et al Adaptive Noise Cancelling: Principles and Applications, Proceedings of the IEEE, Vol 63 No 12 pp 1692 (1975)". The adaptive noise canceller comprises an adaptive filter (40) which takes the initial audio signal as the reference input. The canceller may be used to remove the contribution of the audio signal from the output of a vibration sensor before any further processing occurs. The adaptive filter shown is one example of an adaptive filter that can be applied to this task.

Figure 16A:
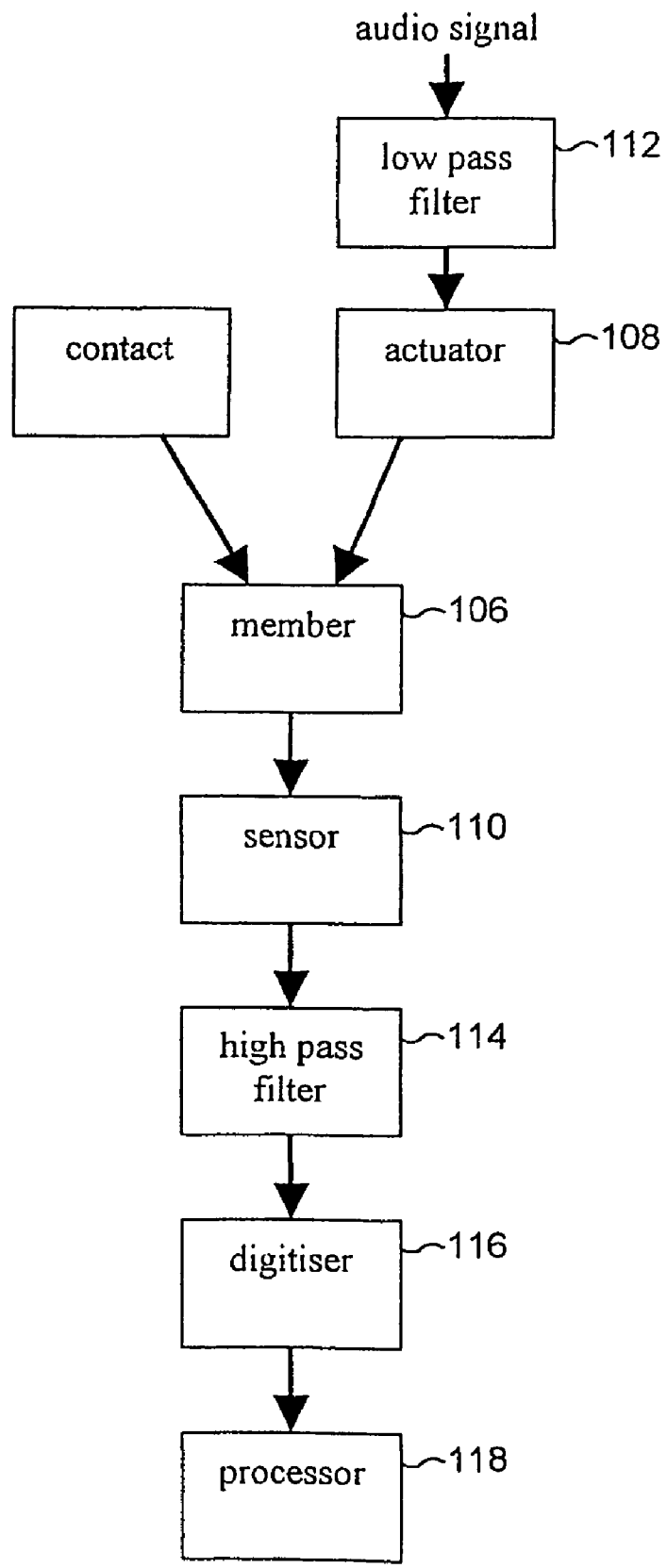
FIG. 16a is a schematic block diagram of a contact sensitive device which also operates as a loudspeaker.
Figure 16B:
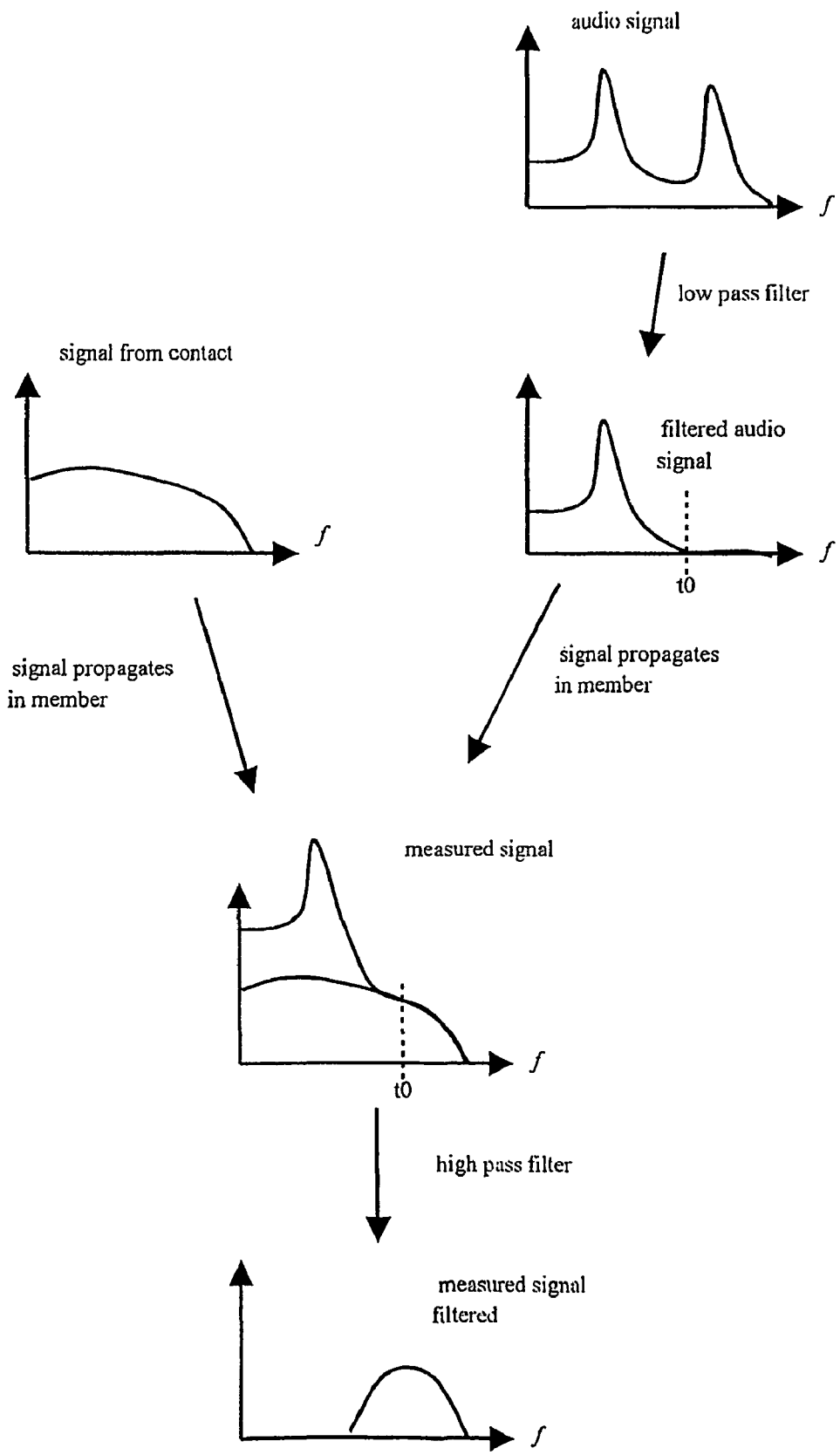

FIG. 16a shows a contact sensitive device which also operates as a loudspeaker. FIG. 16b shows a method for partitioning the audio signal and measured signal into two distinct frequency bands so that the contribution of the audio signal to the processed measured signal is suppressed. The device comprises a member (106) in which bending waves are generated by an emitting transducer or actuator (108) and the contact. The emitting transducer applies an audio signal to the member (106) to generate an acoustic output. Before being applied to the member, the audio signal is filtered by a low pass filter (112) which, as shown in FIG. 16b, removes the audio signal above a threshold frequency $f_0$.

As shown in FIG. 16b, the contact generates a signal which has a power output which is substantially constant over a large frequency band. The signal from the contact and the audio signal sum to give a combined signal which is passed through a high pass filter (114) to remove the signal above the threshold frequency $f_0$. The filtered signal is then passed to a digitiser (116) and onto a processor (118).

Figure 17:
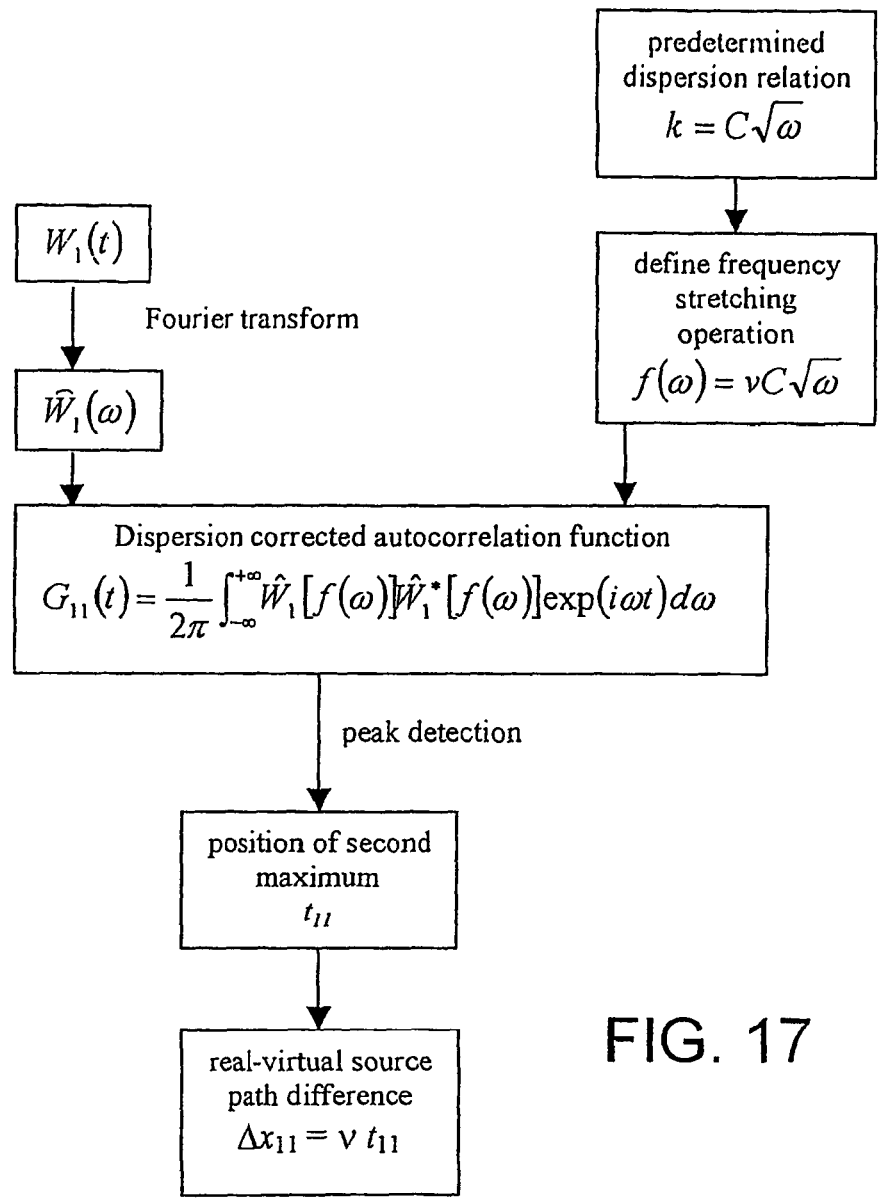
FIG. 17 is a flow chart showing a method of calculating the contact location using the dispersion corrected auto-correlation function.
Figure 17A:
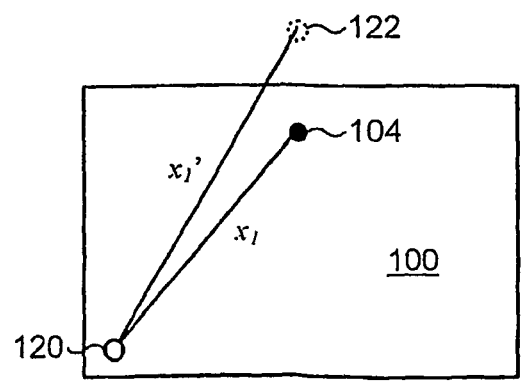
FIG. 17a is a schematic plan view of a device to which the method of FIG. 17 is applied.
Figure 17B:
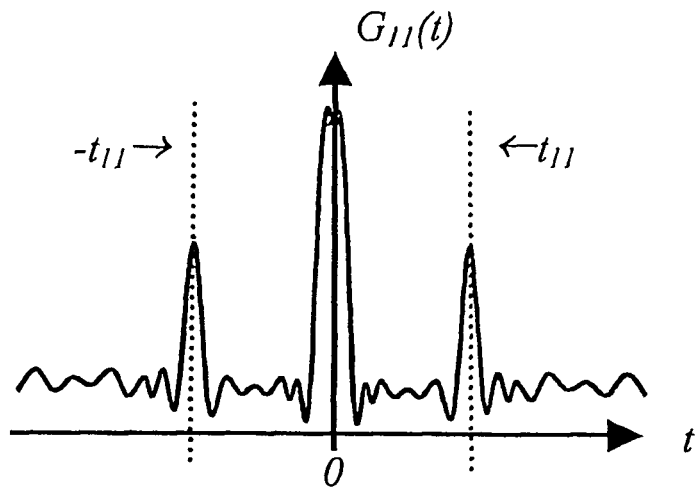
FIG. 17b is a graph of dispersion corrected auto-correlation function against time.

FIG. 17a shows an embodiment having a single sensor (120) mounted on a member (100) to which a contact is applied at a contact location (104). Bending waves are reflected from the edge of the member and create an image of a virtual source which is at location (122). FIG. 17 shows a method of calculating the dispersion corrected auto-correlation function to reveal the contact location (104). The method comprises the following steps:

(a) Measure one bending wave signal $W_1(t)$;
(b) Calculate the Fourier transform of $W'_1(t)$ to arrive at
(c) at the same time as performing steps (a) and (b), the frequency stretching operation $f(\omega) = vC\sqrt{\omega}$ is calculated using the predetermined panel dispersion relation $k = C\sqrt{\omega}$.
(d) $\hat{W}_1(\omega)$ and $f(\omega) = vC\sqrt{\omega}$ are combined to arrive at the dispersion corrected auto-correlation function:

$$G(t) = \frac{1}{2\pi} \int_{-\infty}^{+\infty} \hat{W}_1[f(\omega)] \hat{W}_2^*[f(\omega)] \exp(i\omega t) d\omega;$$

and (g) the dispersion corrected correlation function is plotted against time with peaks occurring at time $t_{11}$ and $-t_{11}$ as shown in FIG. 17b;

(h) $\Delta x_{11}$ is calculated from $t_{11}$; $\Delta x_{12}$ is the path-length difference between the path lengths $x_1$ and $x_1'$ from the first and second sensors to the contact.

(i) $\Delta x_{12}$ is used to calculate the location of the contact.

Figure 18:
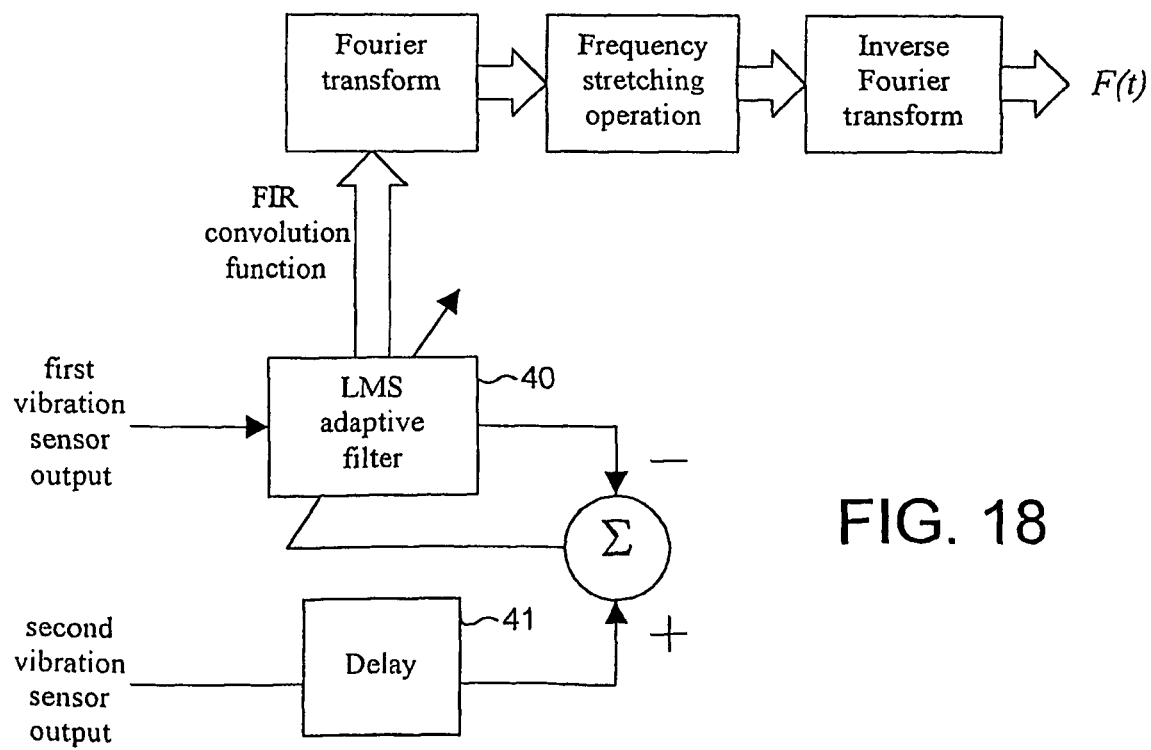
FIG. 18 is a block diagram showing how an adaptive filter may be used to calculate information relating to the contact.

FIG. 18 shows the adaptive filter of FIG. 15 may also be used to calculate the location of the contact from a device comprising two sensors. In general, adaptive filters contain a finite-impulse-response (FIR) filter. A FIR filter is equivalent to a convolution operation, with some convolution function $\Phi(t)$.

The signals $W_1(t)$ measured by the first sensor are sent to the adaptive filter (40) and the signals $W_2(t)$ measured by the second sensor are sent to a delay unit (41). The delay unit delays the signals from the second sensor, preferably by the maximum expected width of the convolution function. The delayed signals are then sent to the primary input of the adaptive filter. The adaptive filter continually updates the convolution function so that an estimate, $\tilde{W}_2(t)$, of the primary signal input, $W_2(t)$, may be obtained from the reference input, $W_1(t)$. The convolution operation is defined as follows:

$$\tilde{W}_2(t) = \int_{-\infty}^{+\infty} W_1(t') \Phi(t-t') dt'.$$

The location of the contact is calculated in the processor by the following steps:

a) Extract the FIR convolution function from the internal memory of the adaptive filter.
b) Calculate the Fourier transform of the FIR convolution function.
c) Apply the frequency stretching operation $f(\omega) = vC\sqrt{\omega}$;
d) Calculate the inverse Fourier transform to arrive at F(t).

F(t) is a phase equivalent of the dispersion correction correlation function G(t) and thus the Fourier transforms of G(t) and F(t) have equal phase but not necessarily the same amplitude. Accordingly, the location of any peaks in the time domain for F(t) and G(t) are the same and thus the location of is the contact may be calculated from the peak of F(t) as described above for G(t).

The invention claimed is:

1. A contact sensitive device comprising a member capable of supporting bending waves, a first sensor mounted on the member for measuring bending wave vibration in the member, the sensor determining a measured bending wave signal and a processor which calculates information relating to a contact on the member from the measured bending wave signal, the processor applying a correction based on the dispersion relation of the material of the member supporting the bending waves, and wherein the processor calculates a dispersion corrected function, wherein the calculated dispersion corrected function is an autocorrelation function.

2. A contact sensitive device comprising:

a member capable of supporting bending waves, a first sensor mounted on the member for measuring bending wave vibration in the member, the first sensor determining a first measured bending wave signal, a processor which calculates information relating to a contact on the member from the measured bending wave signal, the processor applying a correction based on a dispersion relation of the material of the member supporting the bending waves, wherein the device comprises a second sensor to determine a second measured bending wave signal which is measured simultaneously with the first measured bending wave signal and the processor calculates a dispersion corrected function of the two measured bending wave signals, the dispersion corrected function being selected from a group consisting of a dispersion corrected correlation function and a phase equivalent function to the dispersion corrected correlation function, to determine information relating to the contact; and absorbers mounted around at least part of the periphery of the member to absorb reflected waves.

* * * * *